(12) United States Patent
Myoki

(10) Patent No.: US 8,355,164 B2
(45) Date of Patent: Jan. 15, 2013

(54) IMAGING DEVICE, CONTROL METHOD, AND PROGRAM FOR RENDERING DATA AND PERFORMING COLOR MATCHING

(75) Inventor: Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1371 days.

(21) Appl. No.: 11/422,684

(22) Filed: Jun. 7, 2006

(65) Prior Publication Data

US 2006/0279758 A1 Dec. 14, 2006

(30) Foreign Application Priority Data

Jun. 8, 2005 (JP) .................................. 2005-168569
Jun. 8, 2005 (JP) .................................. 2005-168570

(51) Int. Cl.
*G06F 15/00* (2006.01)
(52) U.S. Cl. ........................................................ 358/1.9
(58) Field of Classification Search .................. 345/506, 345/422, 419, 533; 348/746; 358/1.9, 505, 358/500, 2.1, 536; 382/192; 347/19
See application file for complete search history.

(56) References Cited

U.S. PATENT DOCUMENTS

| 5,838,333 A | 11/1998 | Matsuo |
| 7,088,368 B1* | 8/2006 | Andrews ........................ 345/506 |
| 7,097,270 B2* | 8/2006 | Yamazaki ........................ 347/19 |
| 7,385,729 B2* | 6/2008 | Clark et al. ..................... 358/1.9 |
| 2004/0223173 A1* | 11/2004 | Arai ................................ 358/1.9 |

FOREIGN PATENT DOCUMENTS

| JP | 7-107312 A | 4/1995 |
| JP | 8-235346 A | 9/1996 |
| JP | 11-046307 A | 2/1999 |
| JP | 2000-138816 A | 5/2000 |
| JP | 2002-319018 A | 10/2002 |
| JP | 2004-015219 A | 1/2004 |

* cited by examiner

*Primary Examiner* — Benny Q Tieu
*Assistant Examiner* — Jeremiah Bryar
(74) *Attorney, Agent, or Firm* — Canon U.S.A., Inc. IP Division

(57) ABSTRACT

A printing control method comprises a rendering step for rendering a description language document, a color matching step for converting color information specified in the description language document into color information for a printing device which is to print the description language document, and a control step for controlling whether to perform the conversion in the color matching step before the rendering or following the rendering. Appropriately controlling whether to perform color matching before rendering or following rendering enables color reproducibility to be improved.

12 Claims, 24 Drawing Sheets

FIG. 5

```
<?xml version="1.0" standalone="no"?>
<!DOCTYPE svg PUBLIC "-//W3C//DTD SVG 1.1//EN"
"http://www.w3.org/Graphics/SVG/1.1/DTD/svg11.dtd">
<svg width="21.0cm" height="29.7cm" viewBox="0 0 210 297"
xmlns="http://www.w3.org/2000/svg" version="1.1">
<desc>Sample</desc>
<!-- CIRCLE(1) -->
<circle cx="80" cy="80" r="50"
fill="yellow" fill-opacity="0.7" stroke="blue" stroke-width="2" />
<!-- CIRCLE(2) -->
<circle cx="140" cy="80" r="50"
fill="red" fill-opacity="0.5" stroke="blue" stroke-width="2" />
<!-- CIRCLE(3) -->
<circle cx="110" cy="130" r="50"
fill="green" fill-opacity="0.3" stroke="blue" stroke-width="2" />
</svg>
```

| OPERATION CODE (601) | MNEMONIC (602) | OPERAND (603) |
|---|---|---|
| 0 | PageStart | PAGE WIDTH W (mm), PAGE HEIGHT H (mm) |
| 1 | PageEnd | NONE |
| 2 | Fill | R (RED), G (GREEN), B (BLUE), A (ALPHA VALUE) |
| 3 | Stroke | R (RED), G (GREEN), B (BLUE), LINE WIDTH W (mm) |
| 4 | PathStart | NONE |
| 5 | PathEnd | CLOSE FLAG F (1 OR 0) |
| 6 | PathMoveTo | COORDINATE X (mm), COORDINATE Y (mm) |
| 7 | PathLineTo | COORDINATE X (mm), COORDINATE Y (mm) |
| 8 | PathArc | CENTER COORDINATE X (mm), CENTER COORDINATE Y (mm), ANGLE D (°) |

FIG. 8

```
0 210.0 297.0           ; PageStart
2 1.0 1.0 0.0 0.7       ; Fill
3 0.0 0.0 1.0 2.0       ; Stroke
4                       ; PathStart
6 80.0 30.0             ; PathMoveTo
8 80.0 80.0 360.0       ; PathArc
5 0.0                   ; PathEnd
2 1.0 0.0 0.0 0.5       ; Fill
4                       ; PathStart
6 140.0 30.0            ; PathMoveTo
8 140.0 80.0 360.0      ; PathArc
5 0.0                   ; PathEnd
2 0.0 1.0 0.0 0.3       ; Fill
4                       ; PathStart
6 110.0 80.0            ; PathMoveTo
8 110.0 130.0 360.0     ; PathArc
5 0.0                   ; PathEnd
1                       ; PageEnd
```

FIG. 12

| COLUMN | DATA |
|---|---|
| color1 | R, G, B, A |
| color2 | R, G, B, A |
| inputProfile | ID OF INPUT PROFILE |
| printerProfile | ID OF PRINTER PROFILE |
| intent | ID OF RENDERING INTENT |
| colorResult | R, G, B, A |
| pre_or_post | pre OR post |

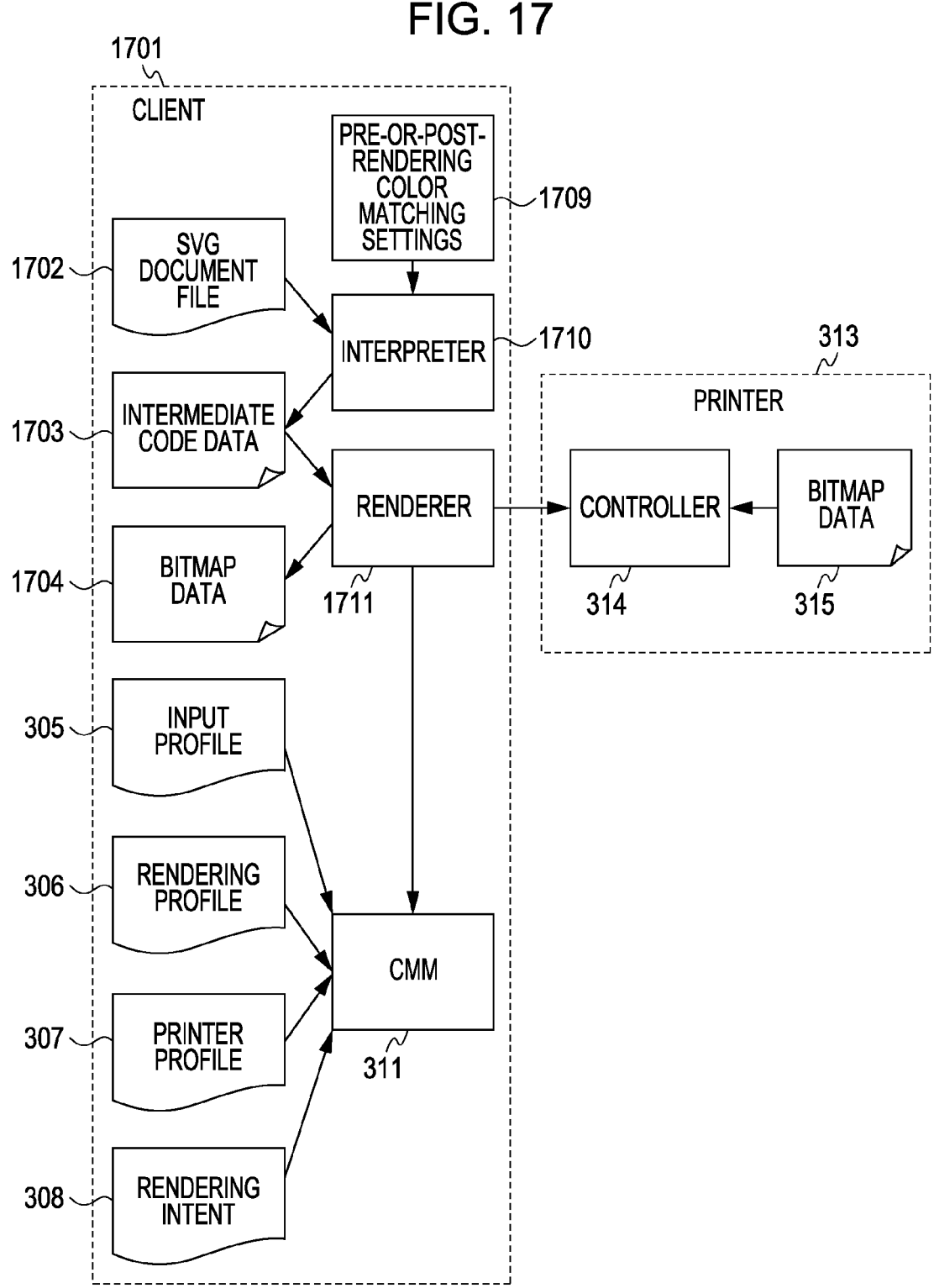

FIG. 18

```
<?xml version="1.0" standalone="no"?>
<!DOCTYPE svg PUBLIC "-//W3C//DTD SVG 1.1//EN"
 "http://www.w3.org/Graphics/SVG/1.1/DTD/svg11.dtd">
<svg width="21.0cm" height="29.7cm" viewBox="0 0 210 297"
    xmlns="http://www.w3.org/2000/svg" version="1.1">
  <desc>Sample</desc>
  <!-- GRADIENT DEFINITION -->
  <defs>
    <linearGradient id="SampleGradient">
      <stop offset="0%"   stop-color="#F00" />
      <stop offset="100%" stop-color="#FF6" />
    </linearGradient>
  </defs>
  <!-- RECTANGLE -->
  <rect x="30" y="30" width="120" height="80"
     fill="url(#SampleGradient)" stroke="blue" stroke-width="2" />
  <!-- CIRCLE (TRANSPARENT) -->
  <circle cx="90" cy="140" r="50"
     fill="#3F3" fill-opacity="0.7" stroke="blue" stroke-width="2" />
</svg>
```

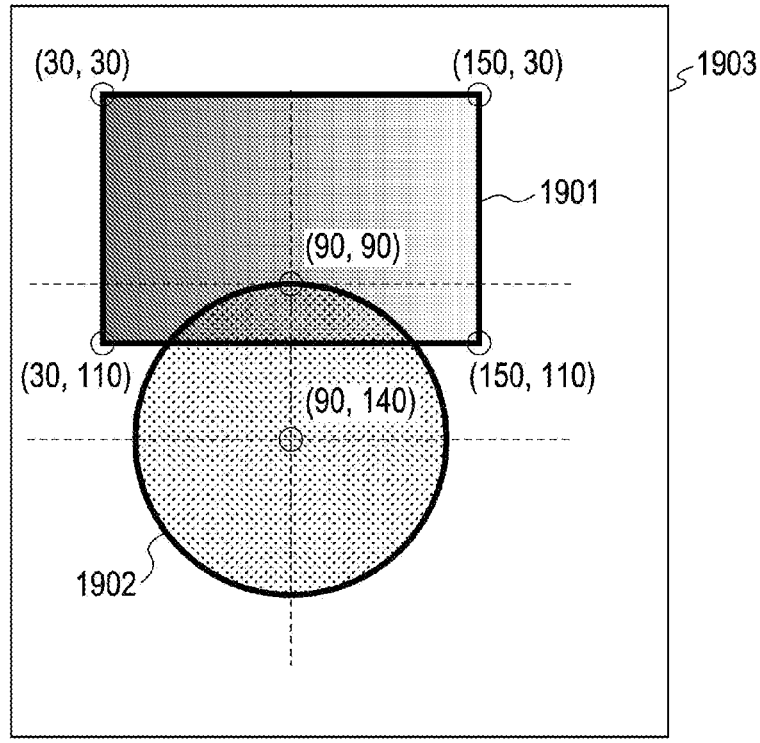

| OPERATION CODE | MNEMONIC | OPERAND |
|---|---|---|
| 0 | PageStart | PAGE WIDTH W (mm), PAGE HEIGHT H (mm), Pre/Post FLAG F (1 OR 0) |
| 1 | PageEnd | NONE |
| 2 | Fill | R (RED), G (GREEN), B (BLUE), A (ALPHA VALUE) |
| 3 | GradLinear | VECTOR START COORDINATE X1 (mm) START COORDINATE Y1 (mm)<br>VECTOR END COORDINATE X2 (mm) END COORDINATE Y2 (mm)<br>GRADATION START R1 (RED), G1 (GREEN), B1 (BLUE)<br>GRADATION END R2 (RED), G2 (GREEN), B2 (BLUE) |
| 4 | Stroke | R (RED), G (GREEN), B (BLUE), LINE WIDTH W (mm) |
| 5 | PathStart | NONE |
| 6 | PathEnd | CLOSE FLAG F (1 OR 0) |
| 7 | PathMoveTo | COORDINATE X (mm), COORDINATE Y (mm) |
| 8 | PathLineTo | COORDINATE X (mm), COORDINATE Y (mm) |
| 9 | PathArc | CENTER COORDINATE X (mm), CENTER COORDINATE Y (mm), ANGLE D (°) |

FIG. 21

```
0  210.0 297.0 1.0                  ; PageStart
3  30.0 30.0 150.0 30.0 1.0 0.0 0.0 1.0 1.0 0.4 ; GradLinear
4  0.0 0.0 1.0 2.0                  ; Stroke
5                                   ; PathStart
7  30.0 30.0                        ; PathMoveTo
8  150.0 30.0                       ; PathLineTo
8  150.0 110.0                      ; PathLineTo
8  30.0 110.0                       ; PathLineTo
6  1.0                              ; PathEnd
2  0.2 1.0 0.2 0.7                  ; Fill
5                                   ; PathStart
7  90.0 90.0                        ; PathMoveTo
9  90.0 140.0 360.0                 ; PathArc
6  0.0                              ; PathEnd
1                                   ; PageEnd
```

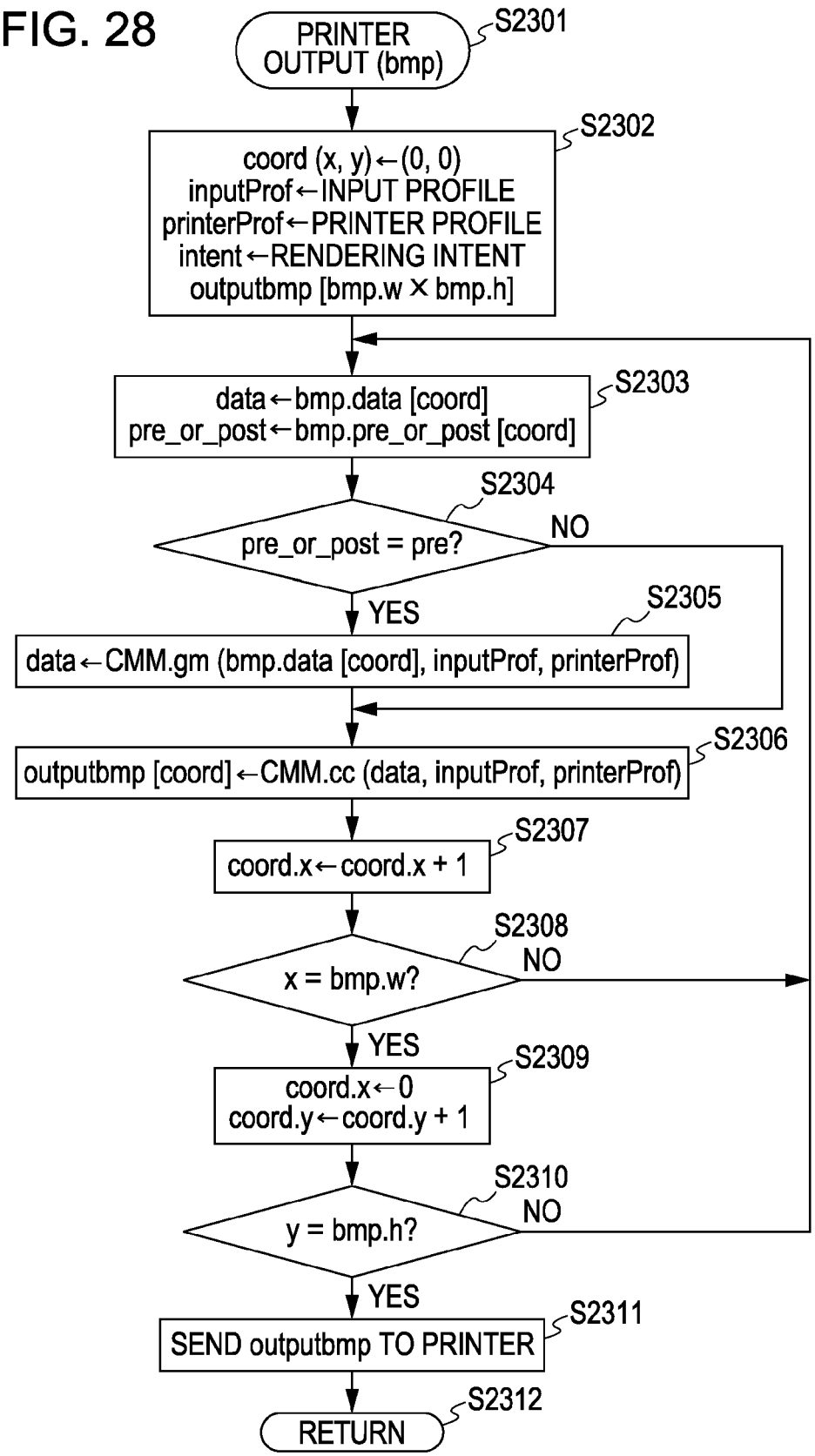

IMAGING DEVICE, CONTROL METHOD, AND PROGRAM FOR RENDERING DATA AND PERFORMING COLOR MATCHING

BACKGROUND OF THE INVENTION

1. Field of the Invention

The present invention relates to the art of rendering and color matching with an imaging device such as a printing device.

2. Description of the Related Art

Conventionally, at the time of outputting color specified in rendering commands in a PDL (Page Description Language) document to a monitor or printer (output device), the PDL document is subjected to gamut mapping/conversion. This gamut mapping/conversion is performed using a profile (ICC profile or the like) of the output device, to perform mapping/conversion of the PDL document into the gamut of the output device. This method is described in Japanese Patent Laid-Open No. 7-107312, for example.

Also, Japanese Patent Laid-Open No. 8-235346 describes converting objects having different attributes (color space, etc.) into respective optimal image data structures, and switching the color matching processing to be applied to the image data structure in real-time.

There are cases wherein opacity (alpha value) is included in PDL document rendering commands as a color specification. Alpha blending is necessary in the event that an image according to rendering commands having opacity and an image according to other rendering commands overlap. In such instances, rendering results differ depending on whether mapping to the gamut of the output device (e.g., a printer) before performing the alpha blending for the rendering commands, or performing alpha blending after mapping to the gamut of the output device. However, there is no single factor which determines which timing for gamut mapping would be better. Rendering results are affected by the colors and alpha values specified in the rendering commands, the output device, profiles used at the time of gamut mapping, rendering intent, and so forth.

Also, in the event that a paint command in the PDL document includes gradient, gradient rendering is necessary. In this case as well, rendering results differ depending on whether mapping to the gamut of the device is performed before performing gradient rendering, or performing gradient rendering is performed before mapping to the gamut of the device. As can be seen here, whether to perform color matching before or after certain types of rendering such as alpha blending and gradient needs further consideration.

SUMMARY OF THE INVENTION

In light of the above problems, the present invention provides for appropriate control regarding whether to perform color matching before rendering or following rendering, thereby improving color reproducibility.

According to one aspect of the present invention, a control method comprises a rendering step for rendering a description language document, a color matching step for converting color information specified in the description language document into color information for an imaging device which is to image the description language document, and a control step for controlling whether to perform the conversion in the color matching step before the rendering or following the rendering.

Further features of the present invention will become apparent from the following description of exemplary embodiments with reference to the attached drawings.

BRIEF DESCRIPTION OF THE DRAWINGS

FIG. 5 is a diagram illustrating the contents of an SVG document file used with the first embodiment.

FIG. 8 shows an example of dumped intermediate code from converting an SVG document file used with the first embodiment.

FIG. 12 is a diagram illustrating a configuration example of a verification result database in the first embodiment.

FIG. 17 is a block diagram illustrating the overall configuration of a second embodiment.

FIG. 18 is a diagram illustrating the contents of an SVG document file used with the second embodiment.

FIG. 19 is a rendering example of the contents of an SVG document file used with the second embodiment.

FIG. 20 is a diagram illustrating intermediate code specifications used with the second embodiment.

FIG. 21 shows an example of dumped intermediate code from converting an SVG document file used with the second embodiment.

FIG. 28 is a flowchart illustrating printer output operations (defined operations) in the second embodiment.

DESCRIPTION OF THE EMBODIMENTS

First Embodiment

A first embodiment of the present invention will be described in detail with reference to the drawings.

The PDL used with the present embodiment is SVG (Scalable Vector Graphics) 1.1. The SVG 1.1 Specification can be found at http://www.w3.org/TR/SVG11/.

At a user PC (client), an SVG document file is converted into intermediate code data by an interpreter. Next, a renderer converts the intermediate code data into bitmap data. With the present embodiment, at the time of conversion of the intermediate code data input bitmap data, the precision is measured for pre-rendering color matching and post-rendering color matching, and the one with higher precision is selected. The selection results are saved for this and later rendering sessions. The printer performs output using the bitmap data obtained by rendering, thereby yielding the printed results.

Figure 1:
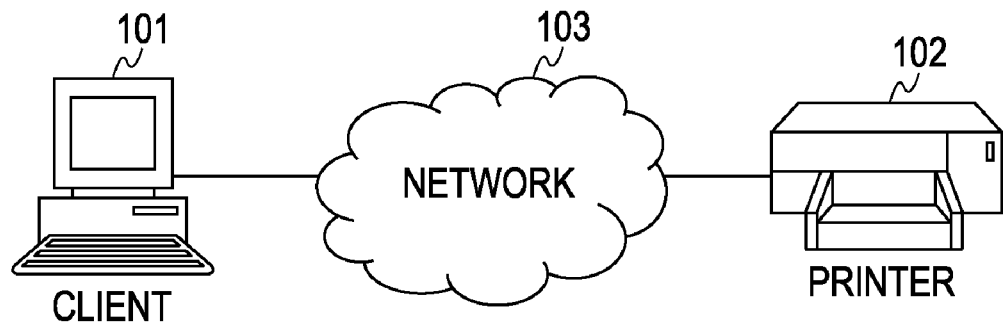
FIG. 1 is a diagram illustrating a schematic configuration of an embodiment of the present invention.

First, the overall configuration of the present embodiment will be described with reference to FIG. 1. In FIG. 1, reference numeral 101 denotes a client PC from which the user performs operations, and is connected to a network 103 via a network interface. Reference numeral 102 denotes a printer for receiving printing instructions via the network, and is also connected to the network 103 via a network interface. The client PC 101 can send printing instructions to the printer 102 via the network 103.

Next, the configuration of the computer device and the printer used with the present embodiment will be described with reference to FIGS. 2 and 3.

Figure 2:
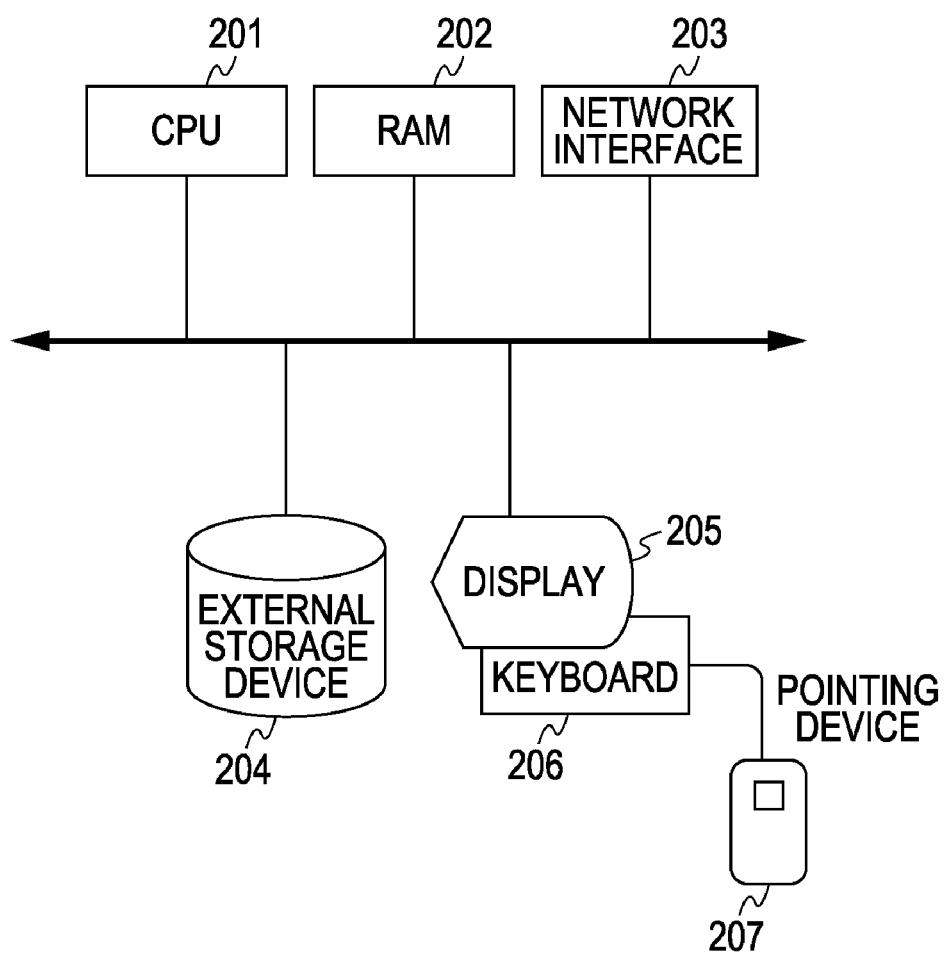
FIG. 2 is a diagram illustrating the configuration of a computer device according to the first embodiment.

FIG. 2 is a block diagram illustrating an example of the configuration of the client PC 101. A CPU 201 controls the entire device, which will be described later, in accordance with control programs stored in the RAM 202. The RAM 202 is an internal storage unit for storing the control programs for the device which the CPU 201 carries out, and also stores data such as document images and the like. A network interface 203 is for connecting to the network and transmitting/receiving data and the like, under the control of the CPU 201. An external storage device 204 is a magnetic disk or the like for storing data. Reference numeral 205 denotes a display, 206 denotes a keyboard, and 207 a pointing device such as a mouse or the like. The programs stored in the RAM 202 perform the following processing, using the functions of the Operating System also stored in the RAM 202, as necessary. Specifically, execution of the programs realizes the following:

(1) reading/writing the contents of data to be temporarily stored in the RAM 202;
(2) reading/writing data from/to the external storage device 204;
(3) sending/receiving data via the network interface;
(4) receiving input from the keyboard 206 and pointing device 207, and displaying on the display 205.

Figure 3:
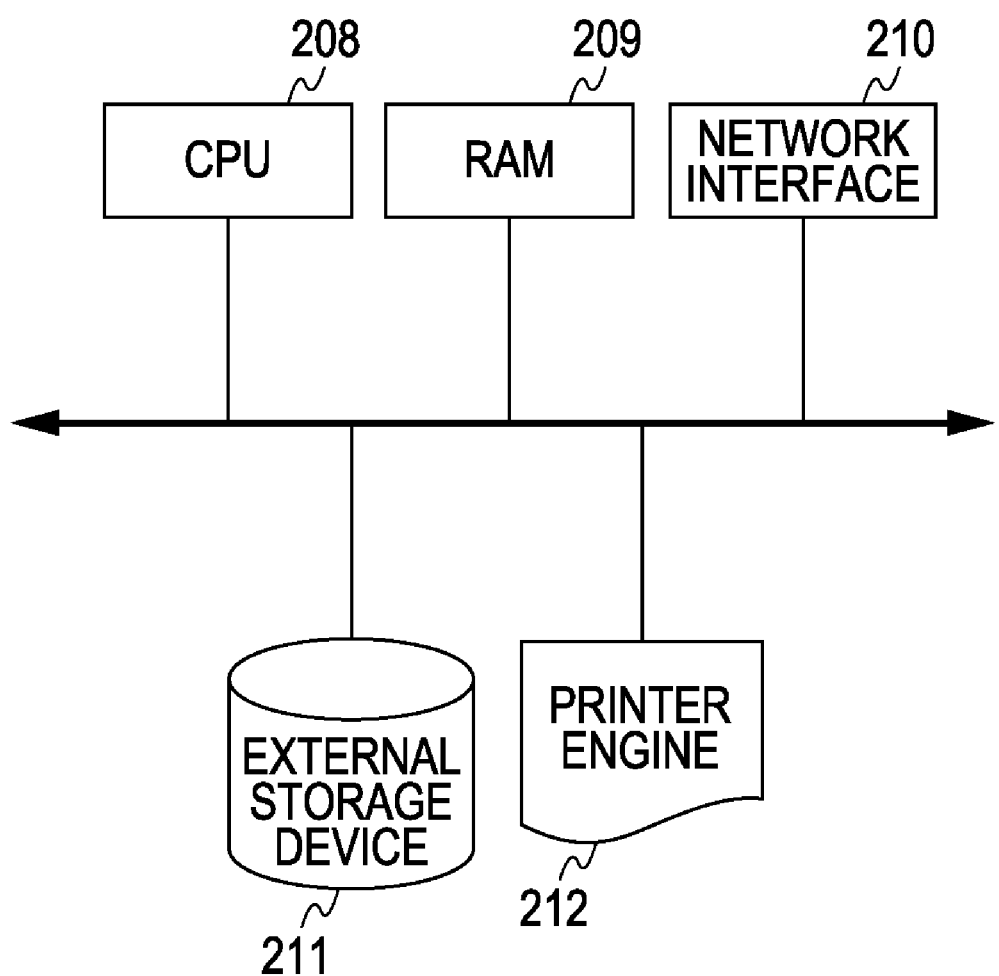
FIG. 3 is a diagram illustrating the configuration of a printer device according to the first embodiment.

FIG. 3 is a block diagram illustrating an example of the configuration of the printer 102. Reference numerals 208, 209, 210, and 211 respectively denote a CPU, RAM, network interface, and external storage device, the same as the with the CPU 201, RAM 202, network interface 203, and external storage device 204 shown in FIG. 2. Reference numeral 212 denotes a printer engine which performs printing. The programs stored in the RAM 209 control the printer engine 212 to perform printing following printing instructions received via the network interface 210. At this time, the contents of the data temporarily stored in the RAM 209 can be read/written, as well as data on the external storage device 211, by processing of the programs stored in the RAM 209.

Figure 4:
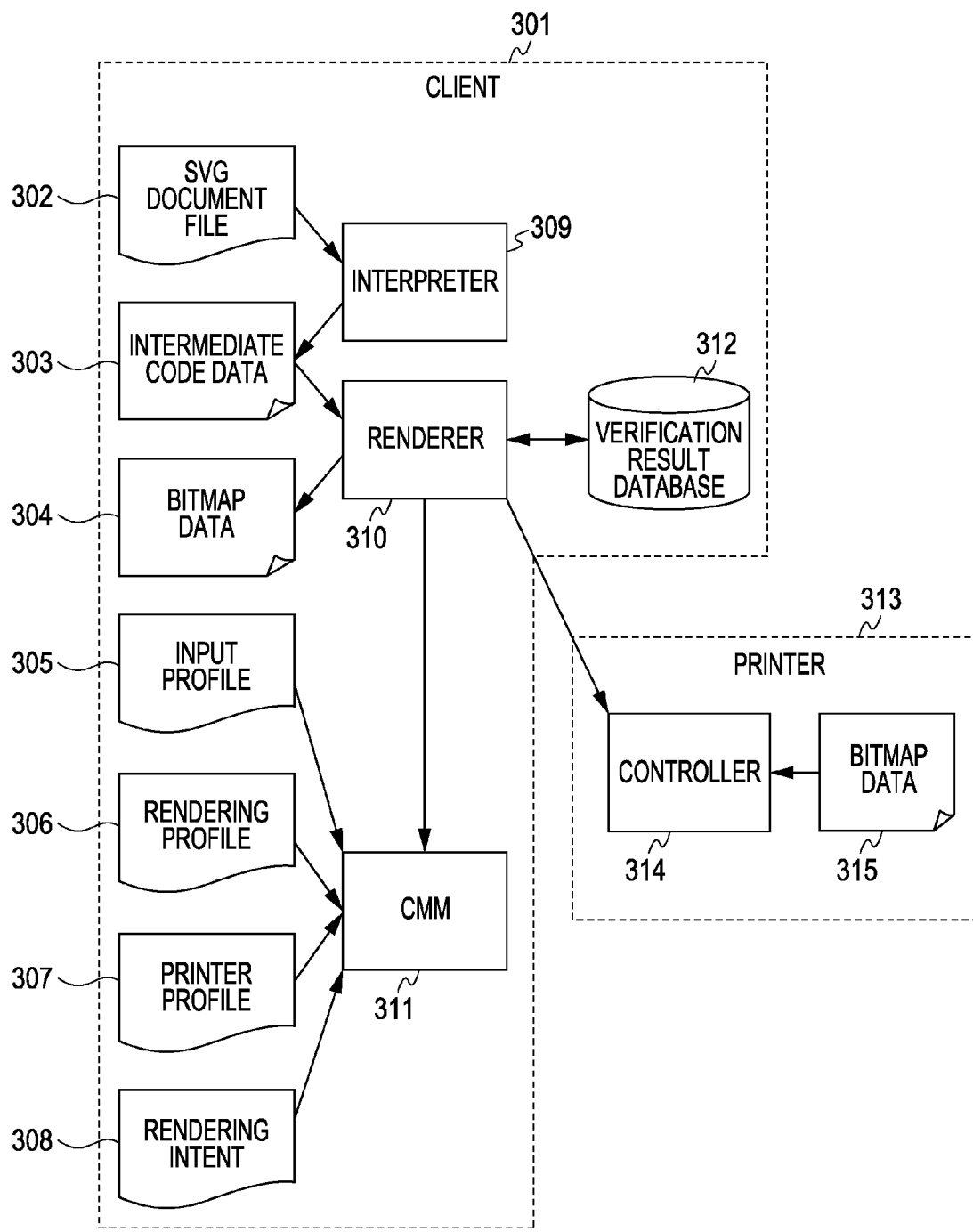
FIG. 4 is a block diagram illustrating the overall configuration of the first embodiment.

Next, the block configuration within the computer device used with the present embodiment will be described with reference to FIG. 4. FIG. 4 shows the logical block arrangement of the client PC 101, printer 102, and network 103, having the physical configuration shown in FIG. 1, primarily with respect to the components involved in the operations of the present embodiment. Specifically, the drawing is a block diagram illustrating the configuration of program modules, file entities, memory data, and communication path.

Reference numeral 301 denotes the boundary of the blocks of the client PC 101, indicating the processing blocks which operate under the control of the Operating System in this case. An interpreter 309, renderer 310, and CMM (Color Management Module) 311 are normally stored in the external storage device 204 as program modules. Upon execution being instructed by a user, the Operating System, or another program, the interpreter 309, renderer 310, and CMM 311 are read into the RAM under the control of the Operating System, and become executable. An SVG document file 302 is stored in external storage device 204, and the interpreter 309 can read/write the contents of this SVG document file 302 using functions of the Operating System.

Programs, including the interpreter 309 and renderer 310, are capable of reading/writing the contents of intermediate code data 303 stored in the RAM 202, using the functions of the Operating System in the same way. Also, programs including the renderer 310 are capable of reading/writing the contents of bitmap data 304 stored in the RAM 202, using the functions of the Operating System in the same way.

The interpreter 309 converts the SVG document file 302 into intermediate code data 303, a conversion which can be mechanically determined from the specifications of the two languages. Accordingly, details of the operations of the interpreter 309 will not be described in the present embodiment; only the contents of conversion will be presented. The renderer 310 creates bitmap data 304 from the intermediate code data 303, and transmits the bitmap data 304 to a controller 314 of the printer 313 via the network 103. At this time, the functions of the CMM 311 are used for color matching.

The CMM 311 performs necessary color matching. This color matching uses:

(1) an input profile 305 representing the input color space of the SVG document file 302 and intermediate code data 303;
(2) a rendering profile 306 which represents the rendering color space of the renderer 310;
(3) a printer profile 307 which represents the device color space of the printer 313; and
(4) a rendering intent 308 which specifies the matching method for performing color matching.

The CMM is normally provided as part of the Operating System or as a library which can be used by the Operating System, as with ICM (Image Color Management) in the case of Microsoft Windows or ColorSync in the case of Apple Mac OS, and the functions thereof are just used at the time of color matching. Accordingly, the operations of the CMM 311 will not be described in detail with the present embodiment, and just an example of usage of the functions thereof will be given.

A verification result database 312 is generated on the external storage device 204 by a database program (not shown). Programs including the renderer 310 use the functions of a database driver (not shown) to read/write the contents of the verification result database 312.

Reference numeral 313 denotes the block boundary of the printer 102. The controller 314 is a program which is stored in the RAM 209 and is always in an executable state. The controller 314 receives bitmap data 304 from the renderer 310 via the network interface 210. Subsequently, the bitmap data 304 is stored in the RAM 209 as bitmap data 315, and the controller 314 controls the printer engine 212 to perform printing according to the bitmap data 315.

Next, the SVG document file used with the present embodiment will be described with reference to FIGS. 5 and 6. First, FIG. 5 shows the contents of the SVG document file 302.

Line 1 is an XML Declaration, stating that the SVG document file has been written to comply with the XML 1.0 specifications.

Lines 2 and 3 are a Document Type Declaration, referencing Document Type Definition (DTD) of SVG 1.1 as an external subset.

Lines 4 and 5 are a start tag for a <svg> element which is a root element. Specified for the <svg> element are the width and height, which are 21.0 cm and 29.7 cm respectively (i.e., A4 size), user coordinates of (0, 0) to (210, 297), and further SVG namespace and compliant SVG version.

Line 6 is a <desc> element, describing the SVG document file. The contents of the <desc> element are not used for rendering SVG documents. Lines 7, 10, and 13, which are comment elements, are also not used for rendering SVG documents.

Lines 8 and 9 are a <circle> element for rendering a first circle. This specifies (80, 80) for the center coordinates in the user coordinate system, and a radius value of 50 in the user coordinate system. Further specified are a fill color of yellow with opacity (alpha value) of 0.7, an outline color of blue, and an outline width of 2 in the user coordinate system.

Lines 11 and 12 are a <circle> element for rendering a second circle. This specifies (140, 80) for the center coordinates in the user coordinate system, and a radius value of 50 in the user coordinate system. Further specified for the inside of the circle are a fill color of red with opacity (alpha value) of 0.5, an outline color of blue, and an outline width of 2 in the user coordinate system.

Lines 14 and 15 are a <circle> element for rendering a third circle. This specifies (110, 130) for the center coordinates in the user coordinate system, and a radius value of 50 in the user coordinate system. Further specified are a fill color of green with opacity (alpha value) of 0.3, an outline color of blue, and an outline width of 2 in the user coordinate system.

Line 16 is an end tag of the <svg> element serving as the root element, and corresponds to the start tag in lines 4 and 5.

Figures 6, 7:
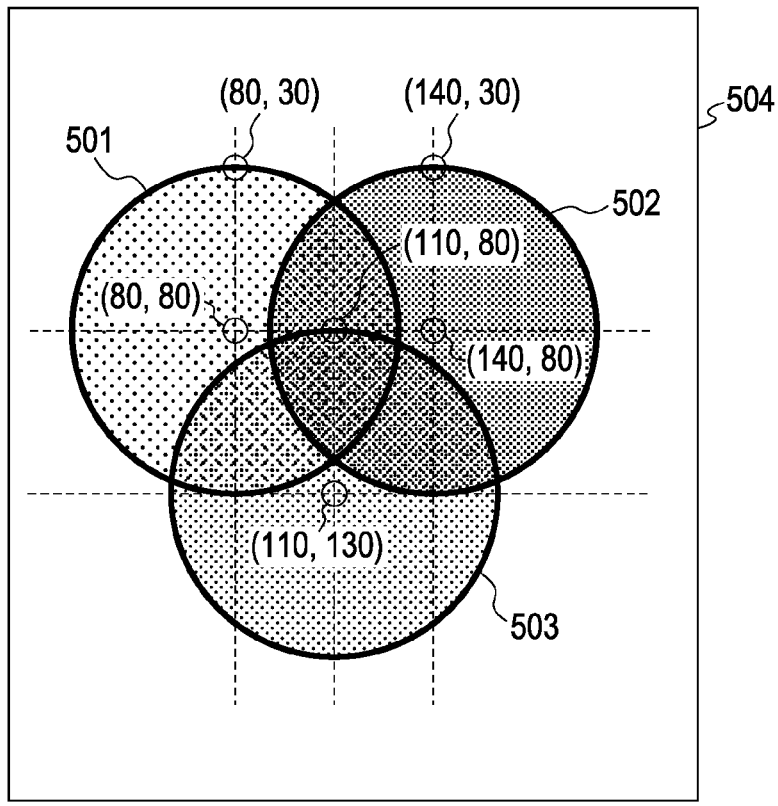
FIG. 6 is an example of the rendered contents of an SVG document file used with the first embodiment.
FIG. 7 is a diagram illustrating intermediate code specifications used with the first embodiment.

FIG. 6 shows an example of rendering the SVG document file shown in FIG. 5. Reference numeral 501 denotes the first circle corresponding to the <circle> element in lines 8 and 9, 502 denotes the second circle corresponding to the <circle> element in lines 11 and 12, and 503 denotes the third circle corresponding to the <circle> element in lines 14 and 15. Reference numeral 504 denotes the circumscribing rectangle of the entire SVG document. The size of the circumscribing rectangle 504 is 21.0 cm wide and 29.7 cm high. The vertical and horizontal dotted lines, the circles at the intersections of the dotted lines, and the coordinates shown near the intersections of the dotted lines are for showing the coordinate values of the coordinates that will be come necessary in later description, and are not included in the actual rendering.

Next, the intermediate code used with the present embodiment will be described with reference to FIGS. 7 and 8. FIG. 7 shows the specifications of the intermediate code used with the present embodiment.

Reference numeral 601 denotes opcode (operation code) representing rendering commands, and is given in the form of numerals. Nine types of opcodes are defined with the present embodiment. The opcode is stored in the intermediate code data 303 as a 1-byte integer. Reference numeral 602 denotes mnemonics given to facilitate human identification of the opcode. Mnemonics are used only in the case of dumping the intermediate code (outputting to a display, printer, file, etc., primarily for debugging), and are not included in the intermediate code data 303. Reference numeral 603 denotes operands representing arguments for the opcode. The number and meaning of the operands differs from one opcode to another. Operands are stored in the intermediate code data as 2-byte floating-point numbers.

Only the increment of mm is used in the intermediate code of the present embodiment. In the case of specifying coordinates or lengths in an operand, all descriptions are made in values converted into mm. Coordinate values are represented in absolute values wherein the upper left of the page is the origin. In the case of specifying color in an operand, RGB (red, green, blue) or RGBA (red, green, blue, alpha) is used, and each of the values of R (red), G (green), B (blue), and A (alpha) are specified within the range of 0.0 to 1.0. In RGB color specification, the alpha value is taken as 1.0.

The opcode 0 (mnemonic PageStart) represents the start of a page. The operands are page width W (mm) and page height H (mm). The opcode 1 (mnemonic PageEnd) represents the end of a page. There is no operand for this. The opcode 2 (mnemonic Fill) is a fill color specification. The fill specified by this Fill is applied to all rendering commands hereafter. The operand for this is RGBA corresponding to the fill color.

The opcode 3 (mnemonic Stroke) specifies the outline. The outline specified with Stroke is applied to all rending commands hereafter. The operands are RGB corresponding to the outline, and the width W (mm) of the outline. With the present embodiment, an alpha value of 1.0 is implied for the color of the outline. The opcode 4 (mnemonic PathStart) represents the start of a path. There is no operand for this.

The opcode 5 (mnemonic PathEnd) represents the end of the path. The operand is a close flag F. In the event that "1" is set here, this means that the path end position to the start position is to be rendered with a straight line, thereby closing the path. No action is taken in the event that "0" is specified.

The opcode 6 (mnemonic PathMoveTo) represents moving the rendering position of the path. This is valid only between a PathStart command and a PathEnd command. PathMoveTo only moves the rendering position, and no actual rendering thereof is performed. The operand is the moving position coordinates specified by values of X (horizontal direction) (mm) and Y (vertical direction) (mm).

The opcode 7 (mnemonic PathLineTo) represents rendering a straight line from the current position of the path to the position specified by the operand. This is valid only between a PathStart command and a PathEnd command. The operand is the line end coordinates specified by values of X (horizontal direction) (mm) and Y (vertical direction) (mm).

The opcode 8 (mnemonic PathArc) represents rendering an arc from the current path position. This is valid only between a PathStart command and a PathEnd command. PathArc always renders arcs in the clockwise direction. The operands are the arc center coordinates specified by values of X (horizontal direction) (mm) and Y (vertical direction) (mm), and the length of the arc (specified by angle D(°)).

FIG. 8 shows the contents of the intermediate code data 303 obtained by the interpreter 309 converting the SVG document file 302 of the contents shown in FIG. 5. The intermediate code data 303 is binary data storing only 1-byte integer opcode and 2-byte floating-point number operands. FIG. 8 shows this binary data tagged and with mnemonics provided, to facilitate human identification thereof.

Line 1 is a page start command, specifying the width and height of the page to 210.0 mm and 297.0 mm with operands. This is equivalent to the <svg> element start tag shown in FIG. 5, with length increments having been converted from centimeters into millimeters.

Line 2 is a fill command to be used in the subsequent rendering, with operands specifying the fill color of yellow with an alpha value of 0.7, i.e., (R, G, B, A)=(1.0, 1.0, 0.0, 0.7). This corresponds to the fill and fill-opacity attributes of the first <circle> element shown in FIG. 5, with the text string description of color specification and numerical description of opacity having been converted into an RGBA expression.

Line 3 is an outline command to be used in the subsequent rendering, with operands specifying the outline color of blue, i.e., (R, G, B)=(0.0, 0.0, 1.0), with a line width of 2.0 mm. This corresponds to the stroke attribute and stroke-width attribute of the three <circle> elements shown in FIG. 5, with the text string description of color specification having been converted into an RGB expression, and the length specification having been converted from the user coordinate system into millimeters.

Lines 4 through 7 are command groups for rendering a circle. The rendering position move command of line 5 and the arc rendering command of line 6 render a circle which is centered on coordinates (80.0 mm, 80.0 mm), starting from coordinates (80.0 mm, 30.0 mm), with an angle of 360°. The inside of the circle is filled with yellow with an alpha value of 0.7 from the command of line 2, and the outline is rendered blue with a line width of 2 mm from the command of line 3. This corresponds to the first <circle> element in FIG. 5 and the rendering results 501 in FIG. 6, with the coordinates specification and length specification having been converted from the user coordinate system into millimeters.

Line 8 is a fill command to be used in the subsequent rendering, with operands specifying the fill color of red with an alpha value of 0.5, i.e., (R, G, B, A)=(1.0, 0.0, 0.0, 0.5). This corresponds to the fill and fill-opacity attributes of the second <circle> element shown in FIG. 5, with the text string description of color specification and numerical description of opacity having been converted into an RGBA expression.

Lines 9 through 12 are command groups for rendering a circle. The rendering position move command of line 10 and the arc rendering command of line 11 render a circle which is centered on coordinates (140.0 mm, 80.0 mm), starting from coordinates (140.0 mm, 30.0 mm), with an angle of 360°. The inside of the circle is filled with red with an alpha value of 0.5 from the command of line 8, and the outline is rendered blue with a line width of 2 mm from the command of line 3. This corresponds to the second <circle> element in FIG. 5 and the rendering results 502 in FIG. 6, with the coordinates specification and length specification having been converted from the user coordinate system into millimeters.

Line 13 is a fill command to be used in the subsequent rendering, with operands specifying the fill color of green with an alpha value of 0.3, i.e., (R, G, B, A)=(0.0, 1.0, 0.0, 0.3). This corresponds to the fill and fill-opacity attributes of the third <circle> element shown in FIG. 5, with the text string description of color specification and numerical description of opacity having been converted into an RGBA expression.

Lines 14 through 17 are command groups for rendering a circle. The rendering position move command of line 15 and the arc rendering command of line 16 render a circle which is centered on coordinates (110.0 mm, 130.0 mm), starting from coordinates (110.0 mm, 80.0 mm), with an angle of 360°. The inside of the circle is filled with green with an alpha value of 0.3 from the command of line 13, and the outline is rendered blue with a line width of 2 mm from the command of line 3. This corresponds to the third <circle> element in FIG. 5 and the rendering results 503 in FIG. 6, with the coordinates specification and length specification having been converted from the user coordinate system into millimeters.

Figure 9:
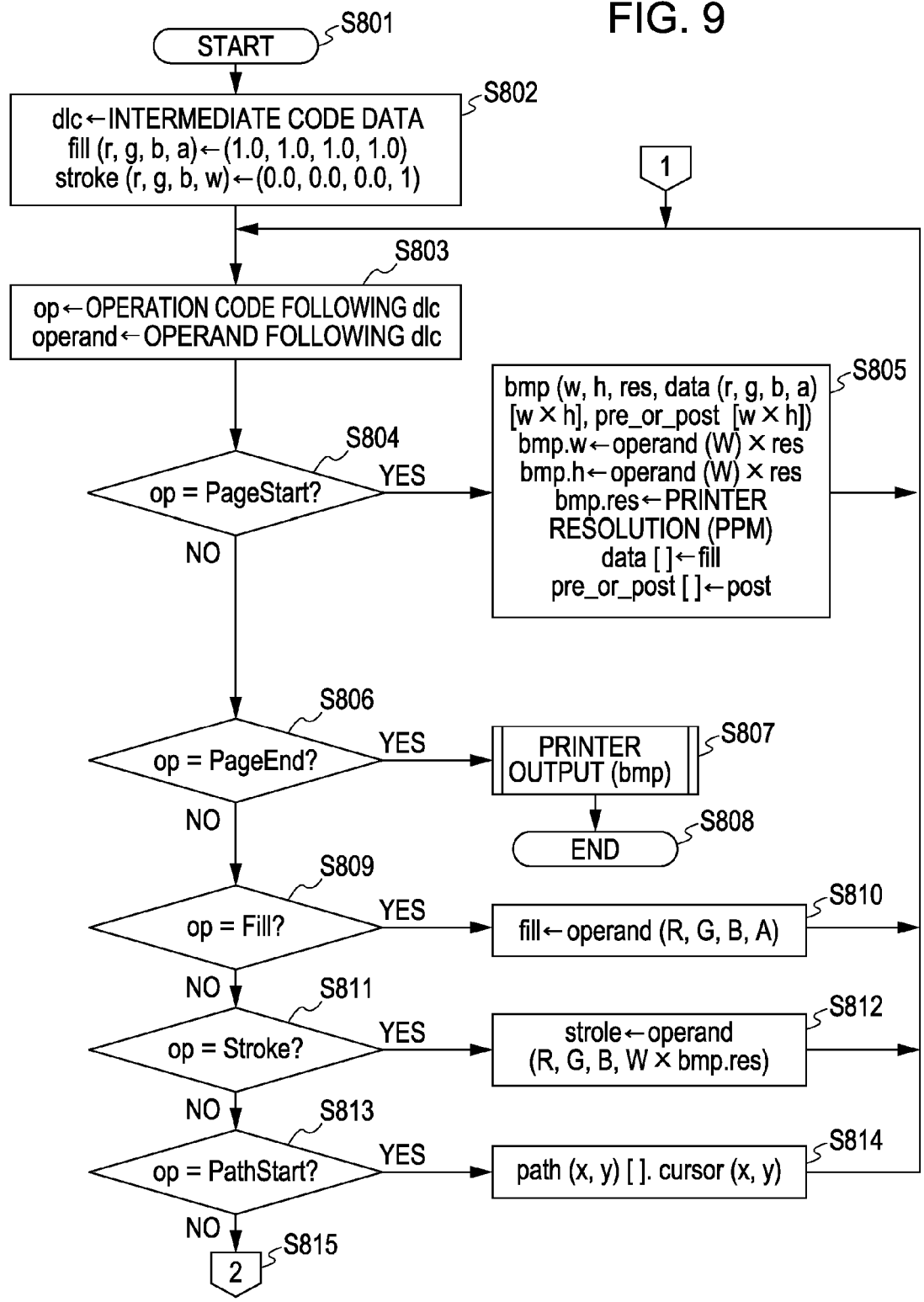
FIG. 9 is a flowchart (1) illustrating the operations of the renderer in the first embodiment.
Figure 10:
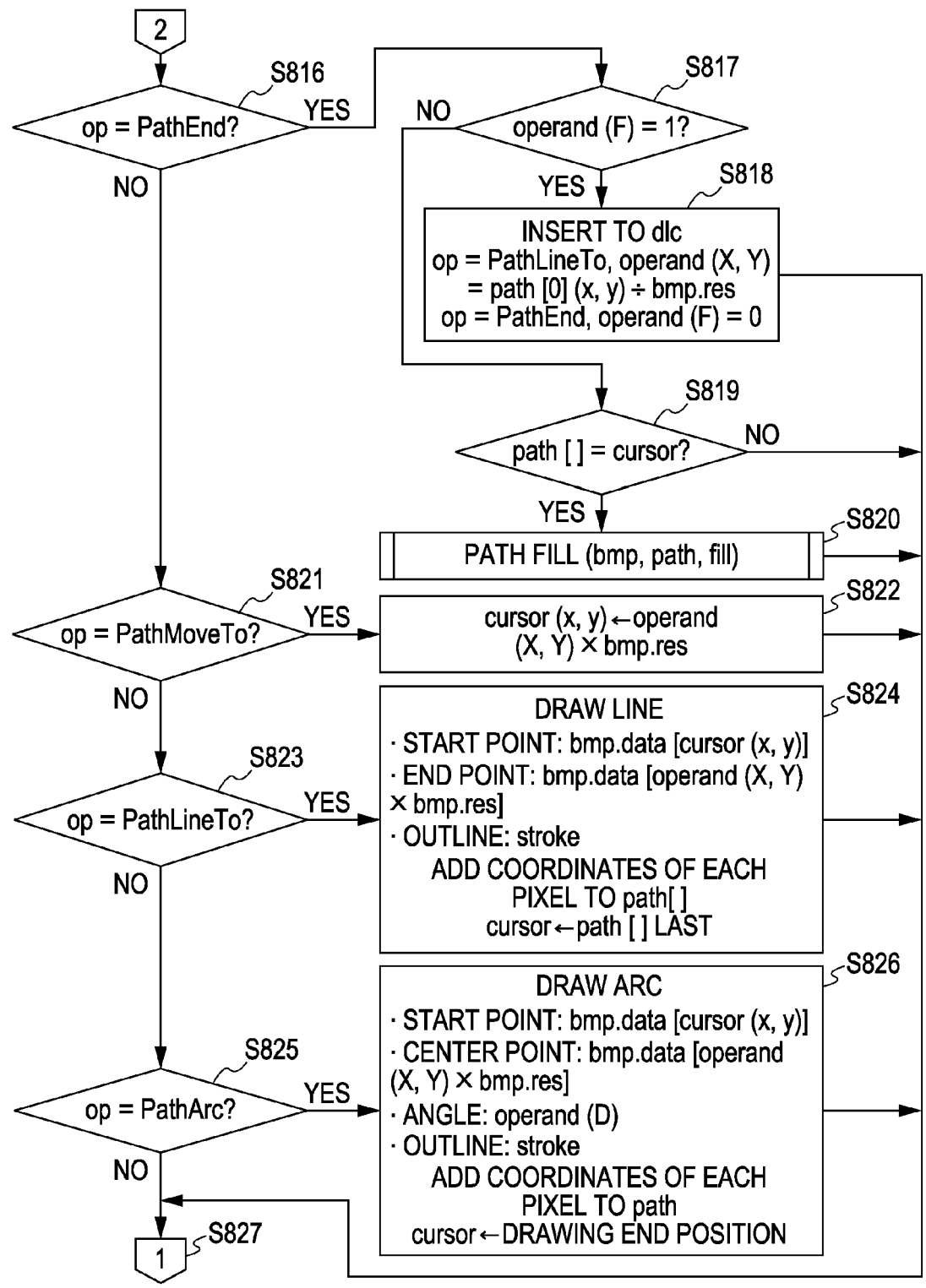
FIG. 10 is a flowchart (2) illustrating the operations of the renderer in the first embodiment.

Next, an overview of the operations of the renderer 310 will be described with reference to FIGS. 9 and 10. FIGS. 9 and 10 show a flowchart of the operations for the renderer 310 rendering the intermediate code data 303 to create bitmap data 304, which is sent to the controller 314 of the printer 313.

The flow of operations starts at step S801. Step S802 is processing for initializing variables. The intermediate code data 303 obtained by converting the SVG document file 302 is read into variable dlc. The "fill" is a variable for holding the color used for the filling applied to the rendering command, with (r, g, b, a) representing the elements of the color expressed by RGBA. The initial value is (1.0, 1.0, 1.0, 1.0), i.e., completely non-transparent (alpha value of 1.0) white. The "stroke" is a variable for holding the color and line width used for the outline applied to the rendering command, wherein (r, g, b, w) represents the elements of the color in RGB, and the line width (in pixels). The initial value is (0.0, 0.0, 0.0, 1), i.e., a black line with a width of 1 pixel.

Step S803 is processing for obtaining the next opcode and operand from the intermediate code data dlc. The obtained opcode and operand are stored in variables "op" and "operand", respectively. Steps S804, S806, S809, S811, S813, S816, S821, S823, and S825 are for determining the type of opcode op, so that appropriate processing can be performed corresponding to each opcode.

In step S804, in the event that the opcode "op" is 0 (mnemonic PageStart), the flow proceeds to step S805. Otherwise, the flow proceeds to step S806.

Step S805 is preparatory processing for a variable bmp which stores the bitmap data 304. Note that the element w of the bmp represents the width (in pixels) of the bitmap data. In order to convert the page width W (mm) in the operand "operand" into bitmap increments (pixels), Operand(W) is multiplied by the output resolution res. The element h of the bmp represents the height (in pixels) of the bitmap data. In order to convert the page height H (mm) in the operand "operand" into bitmap increments (pixels), Operand(H) is multiplied by the output resolution res. The element res in the bmp expresses the output resolution of the printer 313 in PPMs (Pixels Per Millimeter).

The element data[ ] in the bmp is an array for storing bitmap data, the size being w (pixels) horizontally and h (pixels) vertically. The elements (r, g, b, a) of the data[ ] represent the color of each pixel in RGBA. The values of the elements of data[ ] are initialized to the current "fill" value, i.e., completely non-transparent (alpha value of 1.0) white. The element pre-or-post[ ] of the bmp is an array for storing whether pre-rendering color matching or post-rendering color matching has been performed for the pixels, the size being the same as the array data[ ]. In the event that pre-rendering color matching has been performed, "pre" is held as the value, and in the event that post-rendering color matching has been performed, "post" is held. The initial value is post. Following this processing, the flow returns to step S803.

In the event that the opcode op is 1 (mnemonic PageEnd) in step S806, printer output defined processing is called up in step S807, and the flow ends at step S808. Otherwise, the flow proceeds to step S809. This printer output defined processing will be described later with reference to FIG. 14.

In step S809, in the event that the opcode op is 2 (mnemonic Fill), the flow proceeds to step S810. Otherwise, the flow proceeds to step S811.

Step S810 is updating processing of the variable "fill". The color (R, G, B, A) specified in the operand "operand" is stored in the elements (r, g, b, a) of the variable "fill". Once this processing ends, the flow returns to step S803.

In step S811, in the event that the opcode op is 3 (mnemonic Stroke), the flow proceeds to step S812. Otherwise, the flow proceeds to step S813.

Step S812 is updating processing of the variable "stroke". The color (R, G, B) and line width (W) specified in the operand "operand" are stored in the elements (r, g, b, w) of the variable "stroke". At this time, in order to convert the increment (mm) of the operand into the increment (pixels) of the bitmap, W(mm) is multiplied by the output resolution bmp.res. Once this processing ends, the flow returns to step S803.

In step S813, in the event that the opcode op is 4 (mnemonic PathStart), the flow proceeds to step S814. Otherwise, the flow proceeds from step S815 to step S816.

Step S814 is preparatory processing for the variable "path[ ]" and "cursor" for path rendering. This path[ ] is an array for storing coordinate values for the path. The elements (x, y) of path[ ] are coordinate values representing the coordinates of the path in increments of pixels. This cursor is a variable for storing the current rendering position, with the elements (x, y) of being coordinate values representing the rendering position in increments of pixels in this case as well. Once this processing ends, the flow returns to step S803.

In step S816, in the event that the opcode op is 5 (mnemonic PathEnd), the flow proceeds to step S817. Otherwise, the flow proceeds to step S821.

Step S817 is processing for determining whether or not the operand "operand" is 1. In the event that this is 1 the flow proceeds to step S818, otherwise, the flow proceeds to step S819.

Step S818 is closed-path rendering processing. The opcode 7 (mnemonic PathLineTo) is inserted at the current read position of the variable dlc. While the operand is the start position of the current path, which is path[0], conversion is made from the bitmap increments (pixels) to operand increments (mm), so path [0] is divided by output resolution bmp.res. Also, the opcode 5 (mnemonic PathEnd) is also inserted to perform path ending processing again. There is no need for closed-path rendering processing this time so the operand is 0. Once this processing ends, the flow returns from step S827 to step S803.

Step S819 is processing for determining whether or not path filling is necessary. The value of the variable "cursor" representing the current rendering position of the path and the value of the variable path[0], which is the path start position, are compared, and in the event that these are equal, determination is made that the path is closed and accordingly needs filling, so the flow proceeds to step S820. Otherwise, the flow returns from step S827 to step S803.

Step S820 is processing for calling up defined processing for path filling. This path fill defined processing will be described later with reference to FIG. 11.

In step S821, in the event that the opcode op is 6 (mnemonic PathMoveTo), the flow proceeds to step S822. Otherwise, the flow proceeds to step S823.

Step S822 is updating processing of the variables representing the current rendering position of the path. The coordinate values (X, Y) specified in the operand "operand" are stored in the elements (x, y) of the variable "cursor". At this time, in order to convert the increment (mm) of the operand into the increment (pixels) of the bitmap, Operand (X, Y) is multiplied by the output resolution bmp.res. Once this processing ends, the flow returns from step S827 to step S803.

In step S823, in the event that the opcode op is 7 (mnemonic PathLineTo), the flow proceeds to step S824. Otherwise, the flow proceeds to step S825.

Step S824 is processing for rendering a straight line in the bitmap data bmp. The start point is cursor (x, y) which is the current rendering position of the path. The end point is the coordinate values (X, Y) specified with the operand "operand", but in order to convert the increment (mm) of the operand into the increment (pixels) of the bitmap, bmp.data[operand(X,Y)] is multiplied by the output resolution bmp.res. The color (RGB) and line width (pixels) of the variable "stroke" is used for the outline. The coordinate values (in pixels) of the straight line that has been rendered are added to the variable path[ ], and the coordinate value added last (line end point) is stored in the variable "cursor". Once this processing ends, the flow returns from step S827 to step S803.

In step S825, in the event that the opcode op is 8 (mnemonic PathArcTo), the flow proceeds to step S826. Otherwise, processing is skipped and the flow returns from step S827 to step S803, since there is no such case in the intermediate code specifications shown in FIG. 7.

Step S826 is processing for rendering an arc in the bitmap data bmp. The start point is cursor (x, y) which is the current rendering position of the path. The center point is the coordinate values (X, Y) specified with the operand "operand", but in order to convert the increment (mm) of the operand into the increment (pixels) of the bitmap, bmp.data[operand(X,Y)] is multiplied by the output resolution bmp.res. The angle is the angle D(°) specified with the operand "operand". The color (RGB) and line width (pixels) of the variable "stroke" is used for the outline. The coordinate values (in pixels) that has been rendered are added to the variable path[ ], and the coordinate value added last is stored in the variable "cursor". Once this processing ends, the flow returns from step S827 to step S803.

Figure 15:
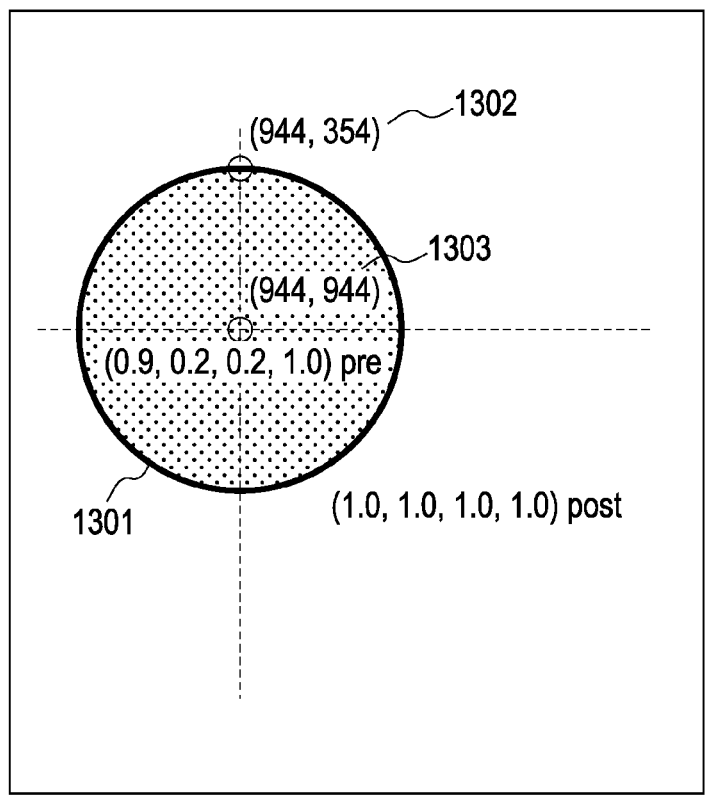
FIG. 15 is a bitmap example (1) of rendering by the renderer of the first embodiment.
Figure 16:
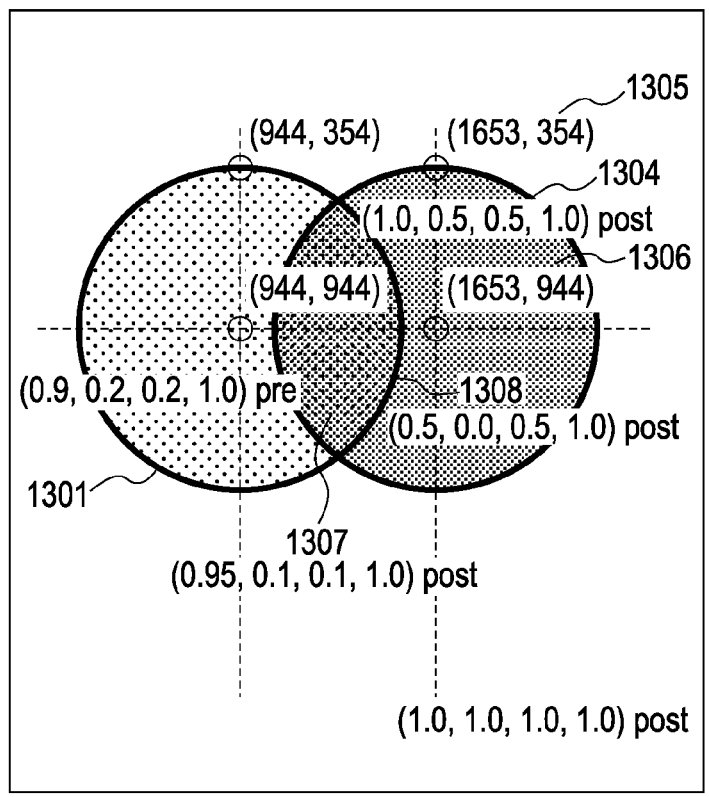
FIG. 16 is a bitmap example (2) of rendering by the renderer of the first embodiment.

An example of the operations of the renderer 310 will be described later with reference to FIGS. 8, 15, and 16.

Figure 11:
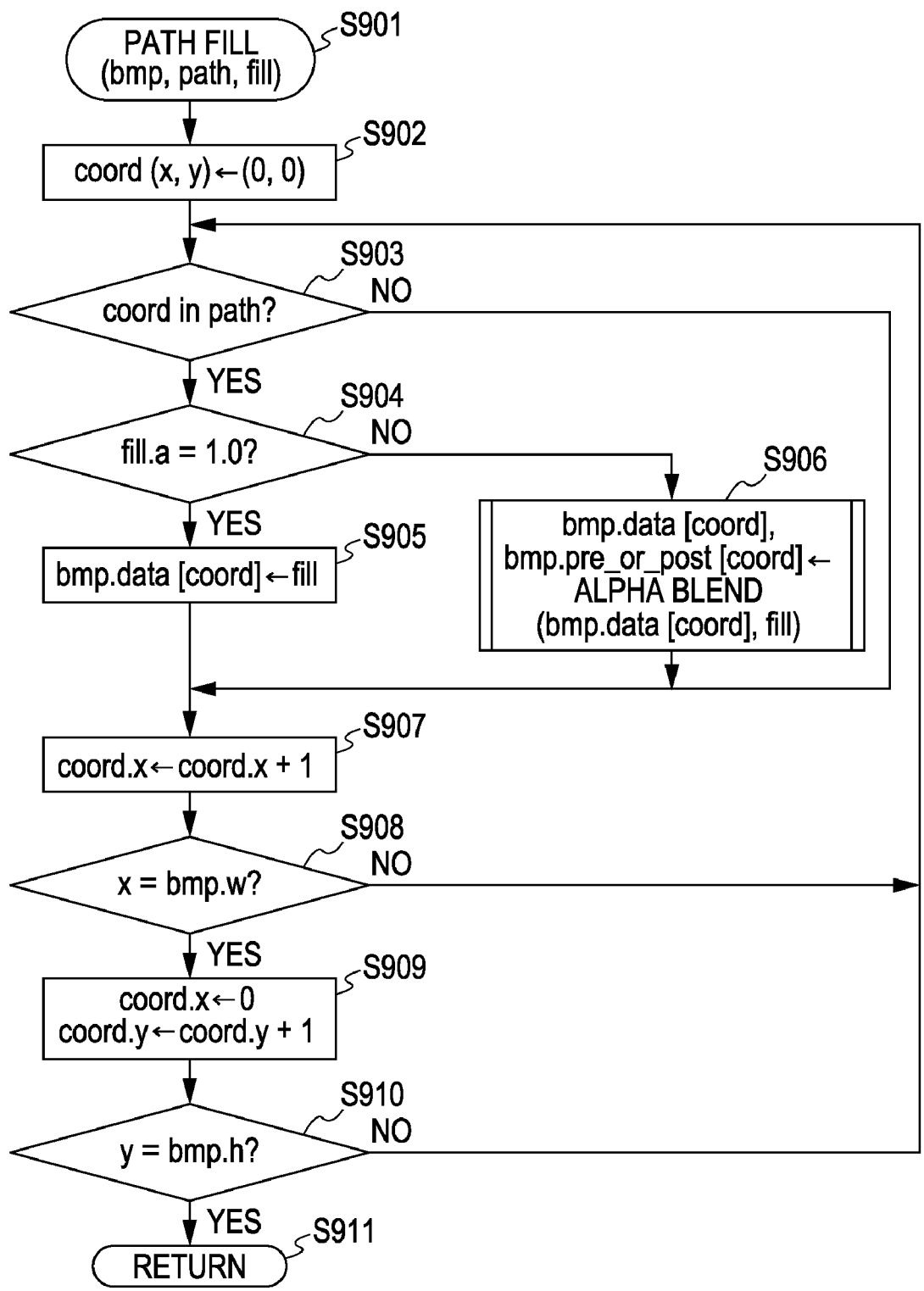
FIG. 11 is a flowchart illustrating path fill operations (defined processing) in the first embodiment.

Next, the path fill operation will be described with reference to FIG. 11. FIG. 11 is a flowchart illustrating defined processing operations for path filling. This defined processing is called up from step S820 in the flowchart shown in FIG. 9.

Step S901 starts the path fill operation, with bmp, path, and fill being arguments at the time of the defined processing being called up. The argument bmp is initialized in step S805 in the flowchart of FIGS. 9 and 10, and has the same value as the variable bmp updated in steps S820, S824, and S826. The argument path is initialized in step S814 in the flowchart of FIGS. 9 and 10, and has the same value as the variable path updated in steps S824 and S825. The argument fill is initialized in step S802 in the flowchart of FIGS. 9 and 10, and has the same value as the variable fill updated in step S810.

Step S902 is variable initialization processing. Here, "coord" is a variable for holding coordinate values at the time of scanning the bitmap data bmp.data[ ] from the upper left to lower right, with (x, y) representing coordinate values in increments of pixels. The initial value is (0, 0), indicating the upper left of the bitmap data bmp.data. The flowchart shown in FIG. 11 is a loop wherein the variable coord is a loop variable.

Step S903 is processing for determining whether or not coordinate values representing the variable coord are within a path represented by the variable "path". This processing is called up in step S820 only in the event that determination is made in step S819 that the variable "path" is a closed path, so the path represented by the variable "path" will always be a closed path here, and determination can be made regarding whether within the path or not for arbitrary coordinate values. In the event that determination is made within the path, the flow proceeds to step S904. If not within the path, the flow proceeds to step S907.

Step S904 is processing for determining whether or not the alpha value of the color which the variable "fill" represents is 1.0 (completely non-transparent). In the event that the alpha value is 1.0 (completely non-transparent), determination is made that there is no need for alpha blending, and the flow proceeds to step S905. In the event that the alpha value is other than 1.0 (i.e., has transparency), determination is made that there is need for alpha blending, and the flow proceeds to step S906.

Step S905 is filling processing performed in the event that the alpha value is 1.0 (completely non-transparent). In this case, there is no need for alpha blending, so the color at the coordinate position coord in the bitmap data bmp.data[ ] is replaced with the color specified by the variable "fill".

Step S906 is processing for calling up the defined processing for alpha blend, performed in the event that the alpha value is other than 1.0 (i.e., has transparency). Return values for the defined processing for alpha blend are the color following alpha blending (RGBA) and a flag of whether pre-rendering color matching or post-rendering color matching has been performed ("pre" or "post"). As a result, the values of the bitmap data bmp.data[ ] and the flag bmp.pre_or_post[ ] at the coordinates position coord are replaced with the returned values. Defined processing for alpha blending will be described later with reference to FIGS. 12 and 13.

Steps S907 through S910 are loop processing. Step S907 is processing for incrementing the horizontal direction value coord.x of the variable coord by 1. Step S908 is processing for determining whether or not the horizontal direction value coord.x of the variable coord has become equal to the size of the bitmap data in the horizontal direction, i.e., bmp.w. In the event that these are equal, the flow proceeds to step S909, and if not equal the flow returns to step S903.

Step S909 is processing for initializing the horizontal direction value coord.x of the variable coord to 0 and incrementing the vertical direction value coord.y of the variable coord by 1. Step S910 is processing for determining whether or not the vertical direction value coord.y of the variable coord has become equal to the size of the bitmap data in the vertical direction, i.e., bmp.h. In the event that these are equal, the flow proceeds to step S911, and if not equal the flow returns to step S903.

Step S911 is the end. Though there are no return values of the defined processing, the bitmap data bmp.data[ ] handed as the argument bmp is updated.

Next, alpha blending operations will be described with reference to FIGS. 12 and 13. FIG. 12 illustrates the configuration of a verification result database 312.

Here, reference numeral 1001 denotes rows making up the records of the verification result database 312, and 1002 denotes data stored in the rows. Reference numerals 1003 and 1004 store RGBA expressions of colors to be subjected to alpha blending.

The rows 1005, 1006, and 1007 store IDs for identifying the input profile 305, printer profile 307, and rendering intent 308, for the renderer 310 to use the CMM 311. The row 1008 stores the color obtained as a result of alpha blending in RGBA expression, and the row 1009 stores whether pre-rendering color matching or post-rendering color matching has been performed (value of "pre" or "post").

Figure 13:
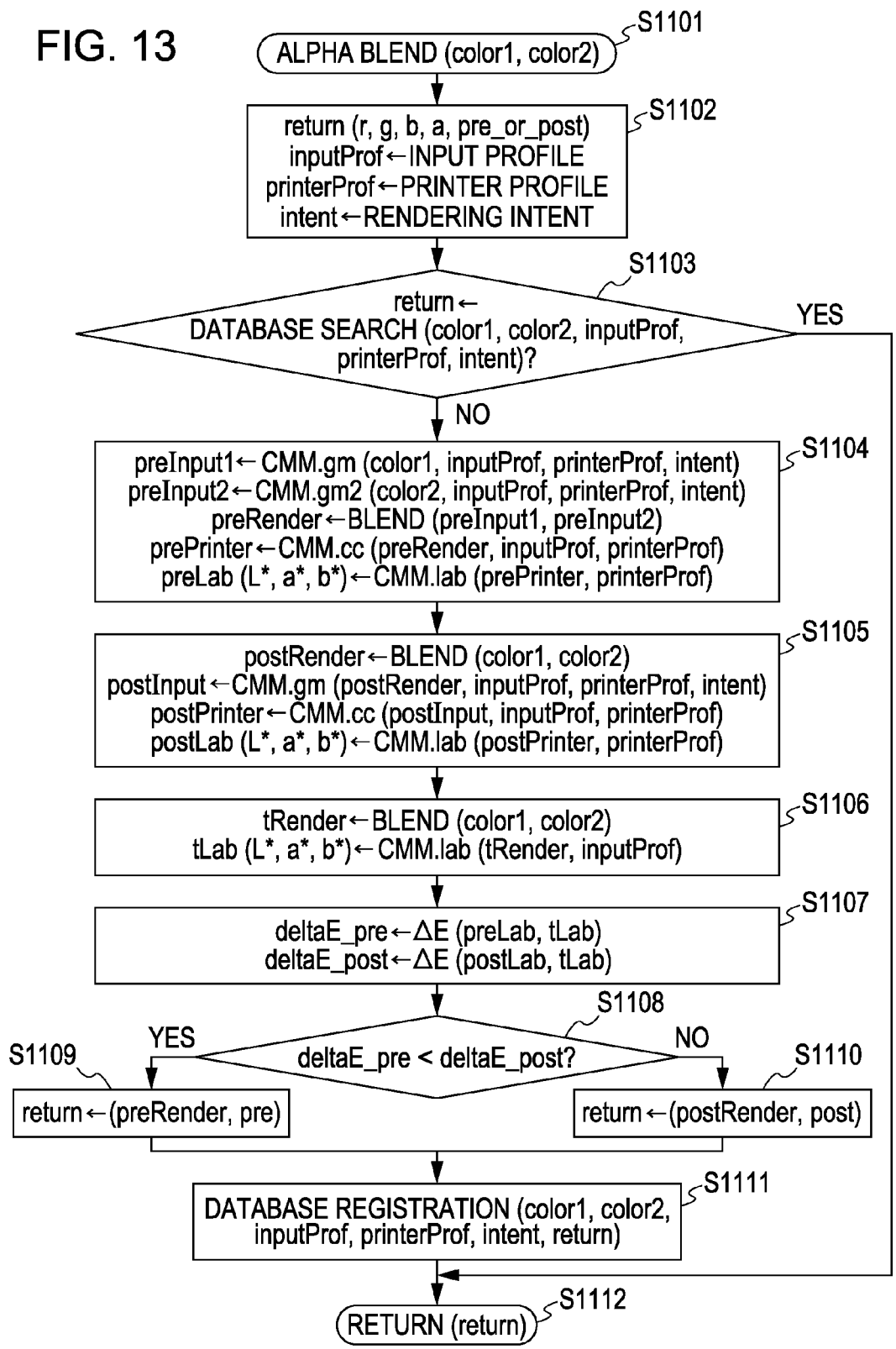
FIG. 13 is a flowchart illustrating alpha blend operations (defined operations) in the first embodiment.

FIG. 13 is a flowchart showing the defined processing for alpha blending. This defined processing is called up from step S906 in the flowchart shown in FIG. 11. In the defined processing, three color matching functions of the CMM 311 are used, i.e., CMM.gm, CMM.cc, and CMM.lab.

CMM.gm performs gamut mapping. The arguments (color, prof1, prof2, intent) are color specification "color", profile "prof1", profile "prof2", and rendering intent "intent". The function of the CMM.gm is to map the color "color" of a gamut which "prof1" expresses according to the "intent" of a gamut which "prof2" expresses, and to return as the color of the gamut which "prof1" expresses.

CMM.cc performs color conversion. The arguments (color, prof1, prof2) are color specification "color", profile "prof1", and profile "prof2". The function of CMM.cc is to convert the color "color" of a gamut which "prof1" expresses to a gamut which "prof2" expresses without mapping, and to return as the color of the gamut which "prof2" expresses. A prerequisite thereof is that the color specified by "color" is within the gamut which "prof2" expresses.

CMM.lab performs conversion to L*a*b* values. The L*a*b* color space is a uniform color space which the CIE (Commission Internationale de l'Eclairage) laid down in 1976, expressed in the terms of lightness index L* and chromaticness indices a* and b*. The arguments (color, prof) are color specification "color" and profile "prof". The function of CMM.Lab is to convert the color "color" of the gamut which the prof represents into L*a*b* values and to return.

Step S1101 is the start of alpha blending. The arguments "color1" and "color2" are the arguments at the time of calling up the defined processing. The argument "color1" is the color value at arbitrary coordinates in the bitmap data bmp.data[ ] initialized in step S805 in FIGS. 9 and 10 and updated at steps S905 and S906 in FIG. 11, or other steps. The argument "color2" is the color value of the variable "fill" initialized in step S802 in FIGS. 9 and 10 and updated in step S810.

Step S1102 is initialization processing for variables. The "return" is a variable for holding return values, with the elements (r, g, b, a) representing the elements of the color in RGBA. The element pre_or_post is a variable for holding whether pre-rendering color matching or post-rendering color matching has been performed, and holds the value "pre" or the value "post". The "inputProf" is a variable for holding the contents of the input profile 306. The "printerProf" is a variable for holding the contents of the printer profile 307. The "intent" is a variable for holding the contents of the rendering intent 308.

Step S1103 is processing for verifying whether or not verification results have been registered in the verification result database 312. The verification result database of which the configuration is shown in FIG. 12 is searched for registered records, with the variable color1, the variable color2, the variable inputProf, the variable printerProf, and the variable intent, as arguments. First, a record wherein color1 matches row 1003, color2 matches row 1004, inputProf matches row 1005, printerProf matches row 1006, and intent matches row 1007, respectively, is found. The values of row 1008 and row 1009 of the record that has been found as the result of the search are each stored in (r, g, b, a) and (pre_or_post) of the variable "return". In step S1103, determination is made regarding whether or not a record has been found, and in the event that a record has been found the flow proceeds to step S1112 and the processing ends. In the event that no record is found, the flow proceeds to step S1104. Due to this configuration, in the event that the results of evaluation regarding whether one of pre-rendering color matching/post-rendering color matching gives a true reproduction of color to the input SVG document has already been registered in the verification result database 312, the results are immediately usable.

Step S1104 is processing for obtaining L*a*b* values in the case that pre-rendering color matching has been performed. First, the CMM.gm function of the CMM 311 is used to map the values of the argument color1 and the values of the argument color2 and from the input gamut to the gamut of the printer 313, using the rendering intent "intent", and the results are stored in variables preInput1 and preInput2. The input gamut is expressed by inputProf, and the gamut of the printer 313 is expressed by printerProf.

Next, blending processing is performed between the value of the variable preInput1 and the value of the variable preInput2, and the results are stored in the variable preRender. The blending processing is performed by subjecting the values (r, g, b, a) of preInput1 and the values (r, g, b, a) of preInput2 to the following calculation.

preRender.$r$=preInput1.$r$×preInput1.$a$+preInput2.$r$×preInput2.$a$×(1−preInput1.$a$)

preRender.$g$=preInput1.$g$×preInput1.$a$+preInput2.$g$×preInput2.$a$×(1−preInput1.$a$)

preRender.$b$=preInput1.$b$×preInput1.$a$+preInput2.$b$×preInput2.$a$×(1−preInput1.$a$)

preRender.$a$=preInput1.$a$+preInput2.$a$×(1−preInput1.$a$)

Finally, the CMM.cc function of the CMM 311 is used to convert the values of the blend results preRender from the input gamut (expressed by inputProf) to the gamut of the printer 313, which are then stored in the variable prePrinter. Also, the CMM.lab function of the CMM 311 is used to convert prePrinter values into L*a*b* values to be stored in the variable preLab.

Step S1105 is processing for obtaining the L*a*b* value in the event that post-rendering color matching has been performed. First, blending processing is performed between the value of the argument color1 and the value of the argument color2, and the results are stored in the variable postRender. The blending processing is performed by subjecting the values (r, g, b, a) of color1 and the values (r, g, b, a) of color2 to the following calculation.

preRender.$r$=color1.$r$×color1.$a$+color2.$r$×color2.$a$×(1−color1.$a$)

preRender.$g$=color1.$g$×color1.$a$+color2.$g$×color2.$a$×(1−color1.$a$)

preRender.$b$=color1.$b$×color1.$a$+color2.$b$×color2.$a$×(1−color1.$a$)

preRender.$a$=color1.$a$+color2.$a$×(1−color1.$a$)

Next, the CMM.gm function of the CMM 311 is used to map the values of the blend results preRender from the input gamut (expressed by inputProf) to the gamut of the printer 313 (expressed by printerProf), with the rendering intent "intent". The results are stored in the variable postInput. Finally, the CMM.cc function of the CMM 311 is used to convert the values of the blend results postInput from the input gamut (expressed by inputProf) to the gamut of the printer 313 (expressed by printerProf), which are then stored in the variable postPrinter. Also, the CMM.lab function of the CMM 311 is used to convert postPrinter values into L*a*b* values to be stored in the variable postLab.

Step S1106 is processing for obtaining logical L*a*b* values in the input gamut (expressed by inputProf). First, blending processing is performed between the value of the argument color1 and the value of the argument color2, and the results are stored in the variable tRender. Blending is performed in the same way as with that in step S1105. Next, the CMM.lab function of the CMM 311 is used to convert the values of the blending results tRender into L*a*b* values to be stored in the variable tLab.

Step S1107 is processing for obtaining the CIE L*a*b* color differences (CIE 1976) between the L*a*b* values preLab and tLab, and postLab and tLab. The color difference $\Delta E_{pre}$ between preLab and tLab, and color difference $\Delta E_{post}$ between postLab and tLab, are calculated by subjecting the preLab values (L*, a*, b*), postLab values (L*, a*, b*), and tLab values (L*, a*, b*), to the following calculations.

$$\Delta E_{pre}^2 = (\text{preLab}.L^* - t\text{Lab}.L^*)^2 + (\text{preLab}.a^* - t\text{Lab}.a^*)^2 + (\text{preLab}.b^* - t\text{Lab}.b^*)^2$$

$$\Delta E_{post}^2 = (\text{postLab}.L^* - t\text{Lab}.L^*)^2 + (\text{postLab}.a^* - t\text{Lab}.a^*)^2 + (\text{postLab}.b^* - t\text{Lab}.b^*)^2$$

The calculation results are each stored in the variables deltaE_Pre and deltaE_Post. The color differences deltaE_Pre and deltaE_Post are compared in step S1108. In the event that the value of the variable deltaE_Pre is smaller, the flow proceeds to step S1109, and otherwise the flow proceeds to step S1110.

Step S1109 is processing performed in the event that the value for the case of pre-rendering color matching is closer to the logical value (i.e., in the event that the comparison in step S1108 yields deltaE_Pre<deltaE_Post). The value of preRender which holds the rendering results of the input gamut (expressed by inputProf) is stored in (r, g, b, a) of the variable "return", and the value "pre" is stored in the (pre_or_post) of the variable "return".

Step S1110 is processing performed in the event that the value for the case of post-rendering color matching is closer to the logical value (i.e., in the event that the comparison in step S1108 yields deltaE_Pre≧deltaE_Post). The value of postRender which holds the rendering results of the input gamut (expressed by inputProf) is stored in (r, g, b, a) of the variable "return", and the value "post" is stored in the (pre_or_post) of the variable "return".

Step S1111 is processing for registering verification results in the verification result database 312. A record is registered in the verification result database of which the configuration is shown in FIG. 12, with the variable color1, the variable color2, the variable inputProf, the variable printerProf, the variable intent, and the variable return, as arguments. That is to say, color1 is registered in the row 1003 of the verification result database, and color2 is registered in row 1004 of the verification result database. Also, inputProf is registered in row 1005, printerProf is registered in row 1006 of the verification result database, and intent is registered in row 1007 of the verification result database. Further, return (r, g, b, a) is registered in row 1008 of the verification result database, and return (pre_or_post) is registered in row 1009 of the verification result database.

Due to the above configuration, evaluation can be made regarding both
(1) the difference between the result of performing rendering with alpha blending and the result of performing color matching following alpha blending, in the input gamut, and
(2) the difference between the result of performing rendering with alpha blending and the result of performing alpha blending following color matching, in the input gamut.

The one with the smaller difference is registered in the verification result database. Consequently, in the event that processing is requested under the same conditions (color values, input profile, output profile, rendering intent), results can be quickly obtained without performing computation again, by reading out the registered processing results from the verification result database.

Step S1112 ends the flow. The value of the variable "return" is returned as a return value.

Figure 14:
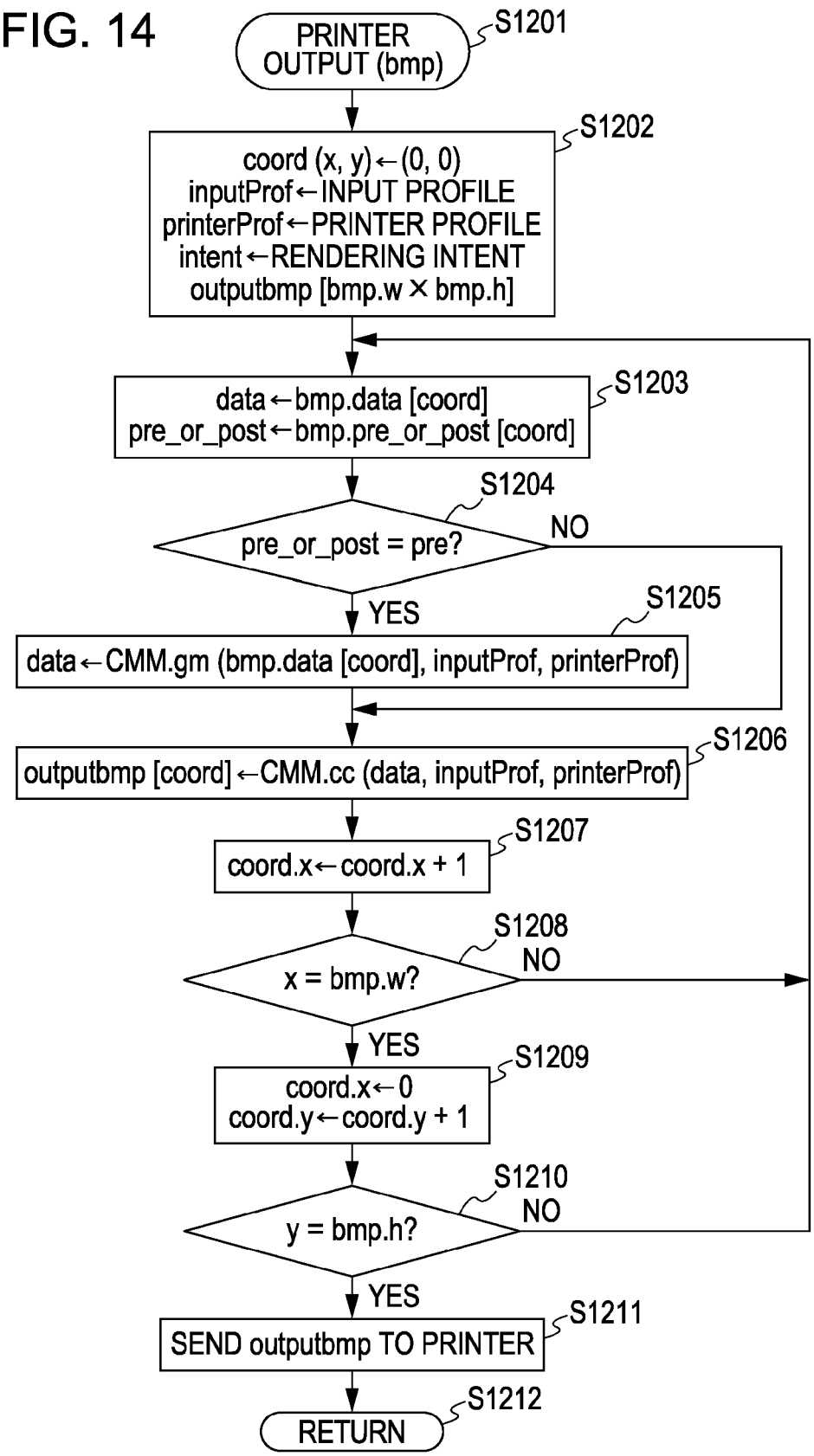
FIG. 14 is a flowchart illustrating printer output preparation operations in the first embodiment.

Next, the operations of printer output will be described with reference to FIG. 14. FIG. 14 is a flowchart describing the operations for defined processing regarding printer output. The defined processing is called up from step S807 in the flowchart shown in FIG. 9.

Step S1201 starts the defined processing. The argument bmp has the same value as the variable bmp initialized in step S805 in the flowchart shown in FIGS. 9 and 10, and rendered in steps S820, S824, and S826.

Step S1202 is variable initialization processing. Here, "coord" is a variable for holding coordinate values at the time of scanning the bitmap data bmp.data from the upper left to lower right, with (x, y) representing coordinate values in increments of pixels. The flowchart shown in FIG. 20 is configured of loop processing wherein the variable "coord" is a primary loop variable. The "inputProf" is a variable for holding the contents of the input profile 305. The "printer-Prof" is a variable for holding the contents of the printer profile 307. The "intent" is a variable for holding the contents of the rendering intent 308. The oputputbmp[ ] is an array for holding bitmap data for printer output, and the size thereof is the same as that of bmp.data[ ].

Step S1203 is processing for obtaining bitmap data of a coordinate value indicated by the variable "coord" and the "pre" or "post" value from the bmp.data[ ] and bmp.pre_or_post[ ]. The obtained values are stored in the variables "data" and "pre_or_post", respectively.

Step S1204 is a determination process for whether or not the variable pre_or_post has the value "pre". In the event that alpha blend rendering has been performed for the pixel, the variable bmp.pre_or_post[ ] initialized to the value post in step S805 has the value pre or post stored therein in step S906. No value is stored at all in the event of other rendering. Accordingly, the only case in which YES holds true in step S1204 is in the event that the pixel has been subjected to pre-rendering color matching and alpha blend rendering. In this case, the flow proceeds to step S1206. Otherwise, the flow proceeds to step S1205.

Step S1205 is processing for using the CMM.gm function of the CMM 311 to map the pixel data (bitmap data) from the input gamut to the gamut of the printer 313 in accordance with the rendering intent "intent". The results are overwritten on the variable "data".

In step S1206, the color values of the variable "data" are already mapped to the gamut of the printer 313 (expressed by printerProf). The CMM.cc function of the CMM 311 is used to convert the variable "data" from the input gamut (expressed by inputProf) to the gamut of the printer 313 (expressed by printerProf). The results are stored at the coordinate position which the variable "coord" indicates in the printer output bitmap data outputbmp[ ].

Steps S1207 through S1210 are loop processing. Step S1207 is processing for incrementing the horizontal direction value coord.x of the variable coord by 1. Step S1208 is processing for determining whether or not the horizontal direction value coord.x of the variable coord has become equal to the size of the bitmap data in the horizontal direction, i.e., bmp.w. In the event that these are equal, the flow proceeds to step S1209, and if not equal the flow returns to step S1203.

Step S1209 is processing for incrementing the vertical direction value coord.y of the variable coord by 1. Step S1210 is processing for determining whether or not the vertical direction value coord.y of the variable coord has become equal to the size of the bitmap data in the vertical direction, i.e., bmp.h. In the event that these are equal, the flow proceeds to step S1211, and if not equal the flow returns to step S1203.

Step S1211 is processing for sending the created printer output bitmap data outputbmp[ ] to the controller 314 of the printer 313. The printer 313 stores the received bitmap data in the RAM 209 as bitmap data 315, and controls the printer engine 212 according to the bitmap data 315 to execute output.

Step S1212 is the end. There is no return value.

Finally, an example of the operations of the renderer 310 will be described with reference to FIGS. 15 and 16, using the intermediate code data shown in FIG. 8. FIGS. 15 and 16 show the way in which the renderer 310 renders the intermediate code data shown in FIG. 8 following the flowcharts shown in FIGS. 9 through 11 and 13.

The intermediate code data is read into the variable dlc in step S802. The variable "fill" is initialized to fill(r, g, b, a)=(1.0, 1.0, 1.0, 1.0). The variable "stroke" is initialized to stroke(r, g, b, w)=(0.0, 0.0, 0.0, 1).

At the first opcode of the dlc (PageStart), the variable bmp is initialized in steps S804 and 805. If we say that the printer resolution is 300 dpi (Dots Per Inch), the resolution converted into PPMs (Pixels Per Millimeter) is 11.811 PPM, since one inch is 25.4 mm. This converted printer resolution is used to obtain bmp.w=210.0×11.811=2480.31≅2480 (rounded off at decimal), bmp.h=297.0×11.811=3507.867≅3507 (rounded off at decimal), with bmp.res=11.811 (PPM). Also, the size of the arrays bmp.data[ ] and bmp.pre_or_post[ ] is 2480×3507=844,856. The bmp.data[ ] is initialized to fill(r, g, b, a)=(1.0, 1.0, 1.0, 1.0) initialized in step S802. pre_or_post[ ] is initialized to "post".

At the second opcode (Fill) of the dlc, the variable "fill" is updated in steps S809 and S810. Here, fill(r, g, b, a)=(1.0, 1.0, 0.0, 0.7).

At the third opcode (Stroke) of the dlc, the variable "stroke" is updated in steps S811 and S812. Now, the line width is obtained by multiplying the 2.0 of the operand by the resolution bmp.res, which is 2.0×11.811=23.622≅23 (rounded off at the decimal), thereby yielding stroke(r, g, b, w)=(0.0, 0.0, 1.0, 23).

At the fourth opcode (PathStart) of the dlc, the variables "path[ ]" and "cursor" are initialized in steps S813 and S814. No processing dependent on operand is performed here, so cursor(x, y)=(0, 0).

At the fifth opcode (PathMoveTo) of the dlc, the variable "cursor" is updated in steps S821 and S822. This is obtained by multiplying the coordinate value by the resolution bmp.res, i.e., cursor.x=80.0×11.811=944.88≅944 (rounded off at the decimal), and cursor.y=30.0×11.811=354.33≅354 (rounded off at the decimal).

With the sixth opcode (PathArc) of the dlc, the arc 1301 is rendered. The start point 1302 is the current value of the variable "cursor", which is (944, 354). The center point 1303 is obtained by multiplying the (80.0, 80.0) of the operand by the resolution bmp.res, which is 80.0×11.811=944.88≅944 (rounded off at the decimal), thereby yielding (944, 944), and the angle is 360° according to the operand. The outline is blue, which is the current value of the variable "stroke", and the line width is 23 pixels. The coordinates of the outline which starts at the start point 1302, traces clockwise along the arc 1301, and returns to the start point 1302, are added to the variable path[ ].

With the seventh opcode (PathEnd) of the dlc, the operand is not 1, so the processing of step S818 is not performed. The start point and end point held in path[ ] are both (944, 354) indicated by 1302, and accordingly, determination is made in step S819 that this is a closed path. This calls up the path fill defined processing (FIG. 11) in step S820.

In the path fill processing, determination is made for each pixel coordinates of the bitmap data whether or not within the path[ ], and if within the path[ ], processing for painting by "fill" is performed. Filling is performed according to the current values of the variable "fill", i.e., (r, g, b, a)=(1.0, 1.0, 0.0, 0.7). The alpha value is not 1.0, and accordingly alpha blend defined processing (FIG. 13) is called up in step S906.

If we say that no record was found in the verification result database in step S1103, alpha blending processing is performed in steps S1104 through S1111. Here, blending is performed between the initialized value (1.0, 1.0, 1.0, 1.0) of the bmp.data[ ] and fill(1.0, 1.0, 0.0, 0.7). Whether pre-blending color matching or post-blending color matching is selected depends in the contents of the input profile 305, printer profile 307, and rendering intent 308, but we will say there that pre-rendering color matching has been selected. We will also say that the value of the bitmap data bmp.data[ ] for a point within the outline 1301 obtained as the result of blending is (0.9, 0.2, 0.2, 1.0), and that the value of pre_or_post[ ] is "pre". The rendering results so far are shown in FIG. 15.

At the eighth opcode (Fill) of the dlc, the variable "fill" is updated in steps S809 and S810. Here, fill(r, g, b, a)=(1.0, 0.0, 0.0, 0.5).

At the ninth opcode (PathStart) of the dlc, the variables "path[ ]" and "cursor" are initialized in steps S813 and S814. No processing dependent on operand is performed here, so cursor(x, y)=(0, 0).

At the tenth opcode (PathMoveTo) of the dlc, the variable "cursor" is updated in steps S821 and S822. This is obtained by multiplying the coordinate value by the resolution bmp.res, i.e., cursor.x=140.0×11.811=1653.54≅1653 (rounded off at the decimal), and cursor.y=30.0×11.811=354.33≅354 (rounded off at the decimal).

With the eleventh opcode (PathArc) of the dlc, the arc 1304 is rendered. The start point 1305 is the current value of the variable "cursor", which is (1653, 354). The center point 1306 is obtained by multiplying the (140.0, 80.0) of the operand by the resolution bmp.res, which is 140.0×11.811=1653.54≅1653 (rounded off at the decimal) and 80.0×11.811=944.88≅944 (rounded off at the decimal), thereby yielding (1653, 944), and the angle is 360° according to the operand. The outline is blue, which is the current value of the variable "stroke", and the line width is 23 pixels. The coordinates of the outline which starts at the start point 1305, traces clockwise along the arc 1304, and returns to the start point 1305, are added to the variable path[ ].

With the twelfth opcode (PathEnd) of the dlc, the operand is not 1, so the processing of step S818 is not performed. The start point and end point held in path[ ] are both (1653, 354) indicated by 1305, and accordingly, determination is made in step S819 that this is a closed path. This calls up the path fill defined processing (FIG. 11) in step S820.

In the path fill processing, determination is made for each pixel coordinates of the bitmap data whether or not within the path[ ], and if within the path[ ], processing for painting by "fill" is performed. Filling is performed according to the current values of the variable "fill", i.e., (r, g, b, a)=(1.0, 0.0, 0.0, 0.5). The alpha value is not 1.0, and accordingly alpha blend defined processing (FIG. 13) is called up in step S906.

If we say that no record was found in the verification result database in step S1103 for this case as well, alpha blending processing is performed in steps S1104 through S1111. Here, blending is performed between the value (0.0, 0.0, 1.0, 1.0) of the bmp.data[ ] and fill(1.0, 0.0, 0.0, 0.5) for the region 1308 overlapping with the outline of the arc 1301. Blending is performed between the value (0.9, 0.2, 0.2, 1.0) of the bmp.data[ ] and fill(1.0, 0.0, 0.0, 0.5) for the region 1307 overlapping with the inside of the arc 1301.

For the remaining region 1306, blending is performed between the initialized value (1.0, 1.0, 1.0, 1.0) of the bmp.data[ ] and fill(1.0, 0.0, 0.0, 0.7). Whether pre-blending color matching or post-blending color matching is selected depends in the contents of the input profile 305, printer profile 307, and rendering intent 308, but we will say there that post-rendering color matching has been selected.

As for the blending results, at the region 1308 overlapping the outline of the arc 1301, the value of the bitmap data bmp.data[ ] is (0.5, 0.0, 0.5, 1.0). Also, at the region 1307 overlapping the inside of the arc 1301, the value of the bitmap data bmp.data[ ] is (0.95, 0.1, 0.1, 1.0). The value of bmp.data[ ] at the remaining region is (1.0, 0.5, 0.5, 1.0). Values for pre_or_post[ ] are all "post". The rendering results so far are shown in FIG. 16. Subsequently, the same processing is performed for the thirteenth through seventeenth opcodes of the dlc.

At the eighteenth opcode (PageEnd), printer output defined processing (FIG. 14) is called up in step S807.

At this point, pixels which have a value of "pre" for pre_or_post[ ], e.g., pixels in regions within the arc 1301 that do not overlap another arc 1304, are mapped to the printer gamut in step S1205. Next, conversion to the printer gamut is performed for all pixels in step S1206. The printer output bitmap thus prepared is sent to the controller 314 of the printer 313 in step S1211, thereby obtaining the final output.

While FIG. 4 shows the intermediate code data 303 and the bitmap data 304 and 305 being held in RAM, arrangements may be made wherein the data is stored in permanent storage such as in files, databases, or the like. Also, an arrangement may be conceived wherein intermediate code data used for the same PDL document is cached and used for subsequent processing.

Also, while FIG. 7 illustrates specifications of intermediate code, the specifications of intermediate code which can be used are not restricted to this. For example, increments are not restricted to millimeters and may be other optional increments, or a combination of both. Path descriptions may be Bezier curves, elliptic arcs, or other optional paths that are capable of mathematical representation. Painting is not restricted to single colors, and may allow for complicated painting such as brush, image, gradient, and so forth. Color is not restricted to RGB and RGBA, and may allow for specification by color profile, specification by device color, specification by Color No., and so forth. Also, the arrangement of using 1-byte integers for opcodes and 2-byte floating-point numbers for operands is a mere example, and other encoding methods may be used. Or, in arrangements wherein the intermediate code is sent to the printer 103, a PDL which the printer 103 is capable of interpreting may be used.

Also, while FIG. 11 illustrates a case of using general-purpose algorithms to scan the entire bitmap, and determining whether each coordinate is included in a path which the argument "path" expresses. Another conceivable method is to extract coordinates included in a path which the argument "path" expresses beforehand, and performing rendering regarding these coordinates.

Also, FIG. 13 illustrates a case of using CIE L*a*b* color difference (CIE 1976) for color difference, but other color differences may be used, such as CIE $\Delta E_{94}$ (CIE 1994) or CIE $\Delta E_{2000}$ (CIE 2000), for example.

Thus, according to the present embodiment, color matching can be performed more appropriately in the event that there is need for alpha blending rendering for a PDL document. Also, color information specified in the PDL can be precisely color-matched with the color information of the printing device, at the time of determining the drawing commands for alpha blending in a PDL document such as SVG or the like, extracting the commands, and performing rendering (S906 in FIG. 11). Specifically, control can be performed to verify whether (1) performing color matching before performing rendering which involves alpha blending, or
(2) performing color matching after performing rendering which involves alpha blending is more precise, and the more precise one is selected.

Accordingly, color matching which is true to the color of the PDL data to be processed can be realized when performing rendering which involves alpha blending.

Moreover, using records stored in the verification result database 312 is efficient, since this does away for the need to calculate the same combination of color matching and rendering multiple times.

Second Embodiment

A second embodiment of the present invention will now be described in detail with reference to the drawings.

The PDL used with the present embodiment is SVG (Scalable Vector Graphics) 1.1. The SVG 1.1 Specification can be found at http://www.w3.org/TR/SVG11/. At a user PC (client), an SVC document file is converted into intermediate code data by an interpreter. At this time, whether to use pre-rendering color matching or post-rendering color matching is specified. This specified information is embedded in the intermediate code data. Next, a renderer converts the intermediate code data into bitmap data.

The renderer selects and executes pre-rendering color matching or post-rendering color matching according to the embedded information, but pre-rendering color matching is always performed for gradient rendering. Pixels which have been subjected to pre-rendering color matching are hereafter always subjected to the same color matching. Finally, the bitmap data is sent to the printer, and the printer performs output using the bitmap data, thereby yielding printing results.

The overall configuration of the second embodiment is the same as that shown in FIG. 1. The configurations of the computer device and the printer are also the same as those shown in FIGS. 2 and 3.

Next, the block configuration within the computer device used with the second embodiment will be described with reference to FIG. 17. FIG. 17 shows the logical block as the physical arrangement of the client PC 101, printer 102, and network 103 primarily relate to the present embodiment. Specifically, the drawing is a block diagram illustrating the configuration of program modules, file entities, memory data, and communication path.

The components in FIG. 17 which are the same as those in FIG. 4 will be omitted from the following description with reference to FIG. 17.

Programs including the interpreter 1710 can read/write the contents of an SVG file 1702 saved in the external storage device 204 using functions of the Operating System. Programs, including the interpreter 1710 and renderer 1711, are capable of reading/writing the contents of intermediate code data 1703 stored in the RAM 202, using the functions of the Operating System in the same way. Also, programs including the renderer 1711 are capable of reading/writing the contents of bitmap data 1704 stored in the RAM 202, using the functions of the Operating System in the same way.

A setting unit 1709 is for setting whether to perform pre-rendering color matching or post-rendering color matching, the setting results being stored in the RAM 202.

SVG Document File

Next, the SVG document file used with the present embodiment will be described with reference to FIGS. 18 and 19. First, FIG. 18 shows the contents of the SVG document file 1702.

Line 1 is an XML Declaration, stating that the SVG document file has been written to comply with the XML 1.0 specifications.

Lines 2 and 3 are a Document Type Declaration, referencing Document Type Definition (DTD) of SVG 1.1 as an external subset.

Lines 4 and 5 are a start tag for a <svg> element which is a root element. Specified for the <svg> element are the width and height, which are 21.0 cm and 29.7 cm respectively (i.e., A4 size), user coordinates of (0, 0) to (210, 297), and further SVG namespace and compliant SVG version.

Line 6 is a <desc> element, describing the SVG document file. The contents of the <desc> element are not used for rendering SVG documents. Lines 7, 14, and 17, which are comment elements, are also not used for rendering SVG documents.

Lines 8 through 13 are SVG paint server definitions for rendering gradients. This definition enables URI reference under the name "SampleGradient" from the "fill" attribute or "stroke" attribute of subsequent rendering elements. Here, the gradients defined are, at the start point, R (red)=FFH, G (green)=0, B (blue)=0, and at the end point, R (red)=FFH, G (green)=FFH, B (blue)=66H.

Lines 14 and 15 are a <rect> element for rendering a rectangle gradient. This specifies (30, 30) for the upper left coordinates value in the user coordinates system, and the width and height values are 120 and 80, respectively, in the user coordinates system. Further specified are painting of the inside of the rectangle with "SampleGradient" gradient, an outline color of "blue" for the rectangle, and an outline width of 2 in the user coordinate system.

Lines 16 and 17 are a <circle> element for rendering an opaque circle. This specifies (90, 140) for the center coordinates in the user coordinate system, and a radius value of 50 in the user coordinate system. Further specified are a fill color within the circle of R (red)=33H, G (green)=FFH, B (blue) =33H, with opacity (alpha value) of 0.7, a circle outline color of "blue", and an outline width of 2 in the user coordinate system.

Line 16 is an end tag of the <svg> element serving as the root element, and corresponds to the start tag in lines 4 and 5.

FIG. 19 shows an example of rendering the SVG document file shown in FIG. 18. Reference numeral 1901 denotes the rectangle corresponding to the <rect> element in lines 14 and 15, and 1902 denotes the opaque circle corresponding to the <circle> element in lines 16 and 17. Reference numeral 1903 denotes the circumscribing rectangle of the entire SVG document. The size of the circumscribing rectangle 1903 is 21.0 cm wide and 29.7 cm high. The vertical and horizontal dotted lines, the circles at the intersections of the dotted lines, and the coordinates shown near the intersections of the dotted lines are for showing the coordinate values of the coordinates that will be come necessary in later description, and are not included in the actual rendering.

Next, the intermediate code used with the present embodiment will be described with reference to FIGS. 20 and 21.

FIG. 20 shows the specifications of the intermediate code used with the present embodiment.

Reference numeral 2001 denotes opcode representing rendering commands, and is given in the form of numerals. Nine types of opcodes are defined with the present embodiment. The opcode is stored in the intermediate code data 1703 as a 1-byte integer.

Reference numeral 2002 denotes mnemonics given to facilitate human identification of the opcode. Mnemonics are used only in the case of dumping the intermediate code, and are not included in the intermediate code data 1703.

Reference numeral 2003 denotes operands representing arguments for the opcode. The number and meaning of the operands differs from one opcode to another. Operands are stored in the intermediate code data 1703 as 2-byte floating-point numbers.

Only the increment of mm is used in the intermediate code of the present embodiment. In the case of specifying coordinates or lengths in an operand, all descriptions are made in values converted into mm. Coordinate values are represented in absolute values wherein the upper left of the page is the origin, as a set of X (horizontal direction) (mm) and Y (vertical direction) (mm). In the case of specifying color in an operand, RGB (red, green, blue) or RGBA (red, green, blue, alpha) is used, and each of the values of R (red), G (green), B (blue), and A (alpha) are specified within the range of 0.0 to 1.0. In RGB color specification, the alpha value is taken as 1.0.

The opcode 0 (mnemonic PageStart) represents the start of a page. The operands are page width W (mm), page height H (mm), and a flag F for whether to perform pre-rendering color matching or post-rendering color matching. An F of 0 represents pre-rendering color matching, and an F of 1 represents post-rendering color matching.

The opcode 1 (mnemonic PageEnd) represents the end of a page. There is no operand for this. The opcode 2 (mnemonic Fill) is a single color fill specification. The fill specified by this Fill is applied to all rendering commands hereafter. The operand for this is RGBA corresponding to the fill color.

The opcode 3 (mnemonic GradLinear) specifies filling by linear gradient. Linear gradient is specified by gradient vectors. The operands are gradient vector start coordinates X1 and Y1, gradient vector end coordinates X2 and Y2, gradient start color R1G1B1, and gradient end color R2G2B2. In the case of the gradient shown by 1901 in FIG. 19, the gradient vector has the start coordinates (30, 30) and end coordinates (150, 30). The color is normalized to 0.0 through 1.0 by dividing the gradient start color and end color each by FFH, thereby obtaining the gradient start color (1.0, 0.0, 0.0) and end color (1.0, 1.0, 0.4). Filling is performed by moving the gradient start color and end color in parallel, orthogonally to the direction of the gradient vector. Also, in the event that filling is necessary at an X coordinate before the start coordinates, the gradient start color is used at that portion. Further, in the event that filling is necessary at an X coordinate after the end coordinates, the gradient end color is used at that portion. In the case of the gradient 1901, the start color (1.0, 0.0, 1.0) is used for filling at X<30 with regard to the gradient vector, and the end color (1.0, 1.0, 0.4) is used for filling at X>150. Of the colors specified with Fill or GradLinear, the color specified last is applied to the subsequent rendering commands.

The opcode 4 (mnemonic Stroke) specifies the outline. The outline specified with Stroke is applied to all rendering commands hereafter. The operands are RGB corresponding to the outline, and the width W (mm) of the outline. The outline is specified in RGB, so an alpha value of 1.0 is applied for the color of the outline. The opcode 5 (mnemonic PathStart) represents the start of a path. There is no operand for this.

The opcode 6 (mnemonic PathEnd) represents the end of the path. The operand is a close flag F. In the event that "1" is set here, this means that the path end position to the start position is to be rendered with a straight line, thereby closing the path. No action is taken in the event that "0" is specified.

The opcode 7 (mnemonic PathMoveTo) represents moving the rendering position of the path. This is valid only between a PathStart command and a PathEnd command. PathMoveTo only moves the rendering position, and no actual rendering thereof is performed. The operand is the moving position coordinates specified by values of X (horizontal direction) (mm) and Y (vertical direction) (mm).

The opcode 8 (mnemonic PathLineTo) represents rendering a straight line from the current position of the path to the position specified by the operand. This is valid only between a PathStart command and a PathEnd command. The operand is the line end coordinates specified by values of X (horizontal direction) (mm) and Y (vertical direction) (mm).

The opcode 9 (mnemonic PathArc) represents rendering an arc from the current path position. This is valid only between a PathStart command and a PathEnd command. PathArc always renders arcs in the clockwise direction. The operands are the arc center coordinates specified by values of X-Y, and the length of the arc, specified by angle D(°).

FIG. 21 shows the contents of the intermediate code data 1703 obtained by the interpreter 1710 converting the SVG document file 1702 of the contents shown in FIG. 18. The intermediate code data 1703 is binary data storing only 1-byte integer opcode and 2-byte floating-point number operands. FIG. 21 shows a dump of this binary data tagged and with mnemonics provided, to facilitate human identification thereof.

Line 1 is a page start command, specifying the width and height of the page to 210.0 mm and 297.0 mm with operands. Also specified is whether to perform pre-rendering color matching or post-rendering color matching. In this case, 1.0, i.e., post-rendering color matching is specified. This is equivalent to the <svg> element start tag shown in FIG. 18, and settings 1709 in FIG. 17, with length specifications having been converted from centimeters into millimeters.

Line 2 is a paint command for linear gradient to be used in the subsequent rendering, with operands specifying the start coordinates of the gradient vector (30.0 mm, 30.0 mm), end coordinates (150.0 mm, 30.0 mm), start color (R, G, B)=(1.0, 0.0, 0.0), and end color (R, G, B)=(1.0, 1.0, 0.4). This corresponds to the gradient definition and URI reference from the "fill" attribute of the <rect> element, shown in FIG. 18. The start coordinates and end coordinates of the gradient vector are calculated from the start position and end position of the rectangle, and color specification is normalized to between 0.0 and 1.0.

Line 3 is an outline command to be used in the subsequent rendering, with operands specifying the outline color of blue, i.e., (R, G, B)=(0.0, 0.0, 1.0), with a line width of 2.0 mm. This corresponds to the stroke attribute and stroke-width attribute of the <rect> element and <circle> element shown in FIG. 18, with the text string description of color specification having been converted into an RGB expression, and the length specification having been converted from the user coordinate system into millimeters.

Lines 4 through 9 are command groups for rendering the rectangle. The following rendering is performed by the operand specifications of the rendering position move command in Line 5, the line rendering command in Lines 6 through 8, and the path end command in Line 9. That is to say, a closed path is rendered connecting the coordinates (30.0 mm, 30.0 mm)_(150.0 mm, 30.0 mm)_(150.0 mm, 110.0 mm)_(30.0 mm, 110.0 mm)_(30.0 mm, 30.0 mm). The inside of the rectangle is filled with a linear gradient from the command in Line 2, and the outline is rendered blue with a line width of 2 mm from the command of line 3. This corresponds to the <rect> element in FIG. 18 and the rendering results 1901 in FIG. 19, with the coordinates specifications having been converted from the user coordinate system into millimeters.

Line 10 is a fill command to be used in the subsequent rendering, with operands specifying the fill color of (R, G, B, A)=(0.2, 1.0, 0.2, 0.7). This corresponds to the fill and fill-opacity attributes of the <circle> element shown in FIG. 18. The color specifications have been normalized to between 0.0 and 1.0.

Lines 11 through 14 are command groups for rendering a circle. The rendering position move command of line 12 and the arc rendering command of line 13 render a circle which is centered on coordinates (90.0 mm, 140.0 mm), starting from coordinates (90.0 mm, 90.0 mm), with an angle of 360°. The inside of the circle is filled with a single color (R, G, B, A)=(0.2, 1.0, 0.2, 0.7) from the command of line 10, and the outline is rendered blue with a line width of 2 mm from the command of line 3. This corresponds to the <circle> element in FIG. 18 and the rendering results 1902 in FIG. 19, with the coordinates specification and length specification having been converted from the user coordinate system into millimeters.

Line 15 is a page end command. There is no operand. This is equivalent to the end tag of the <svg> element in FIG. 18.

Figure 22:
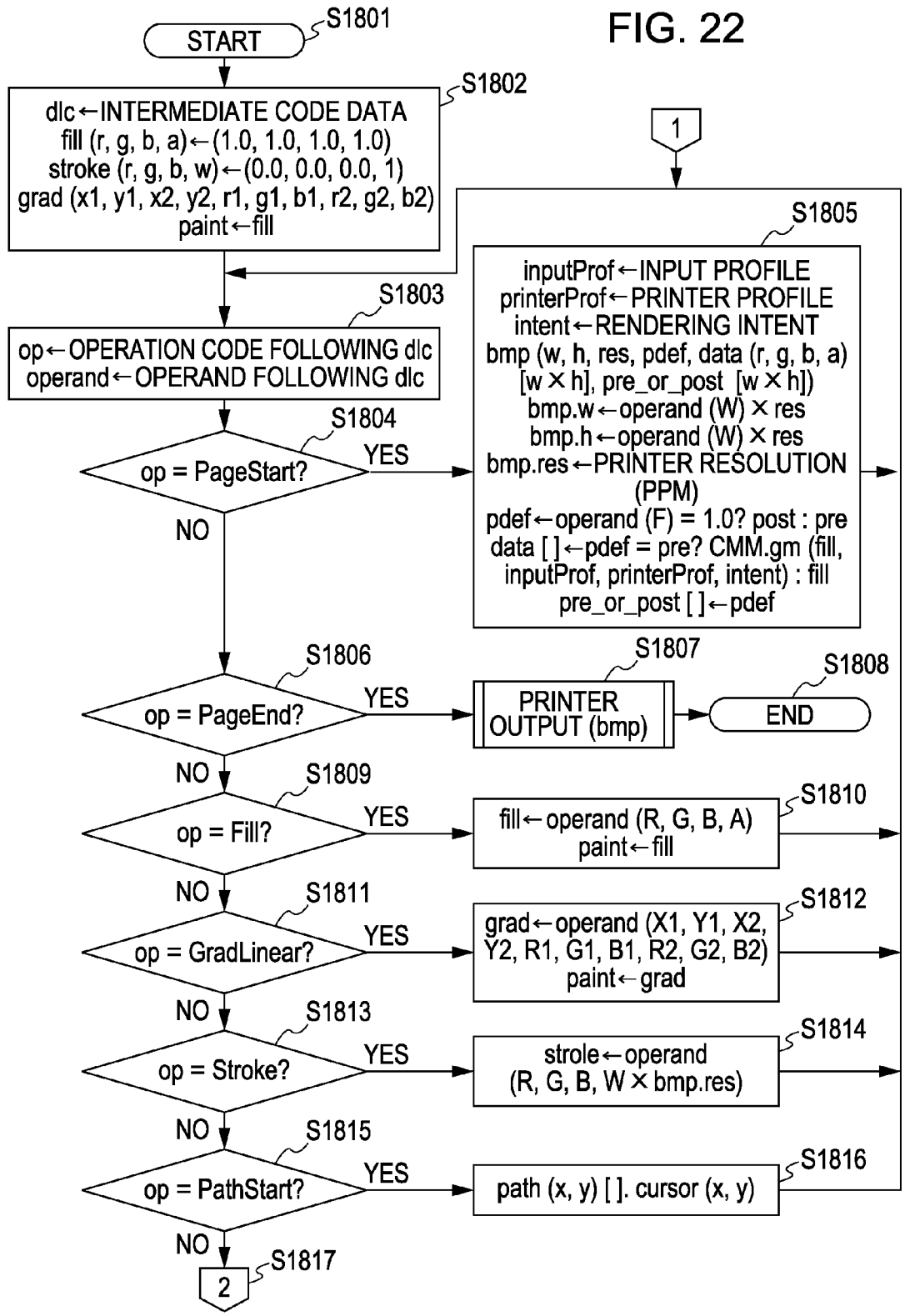
FIG. 22 is a flowchart (1) illustrating the operations of the renderer in the second embodiment.
Figure 23:
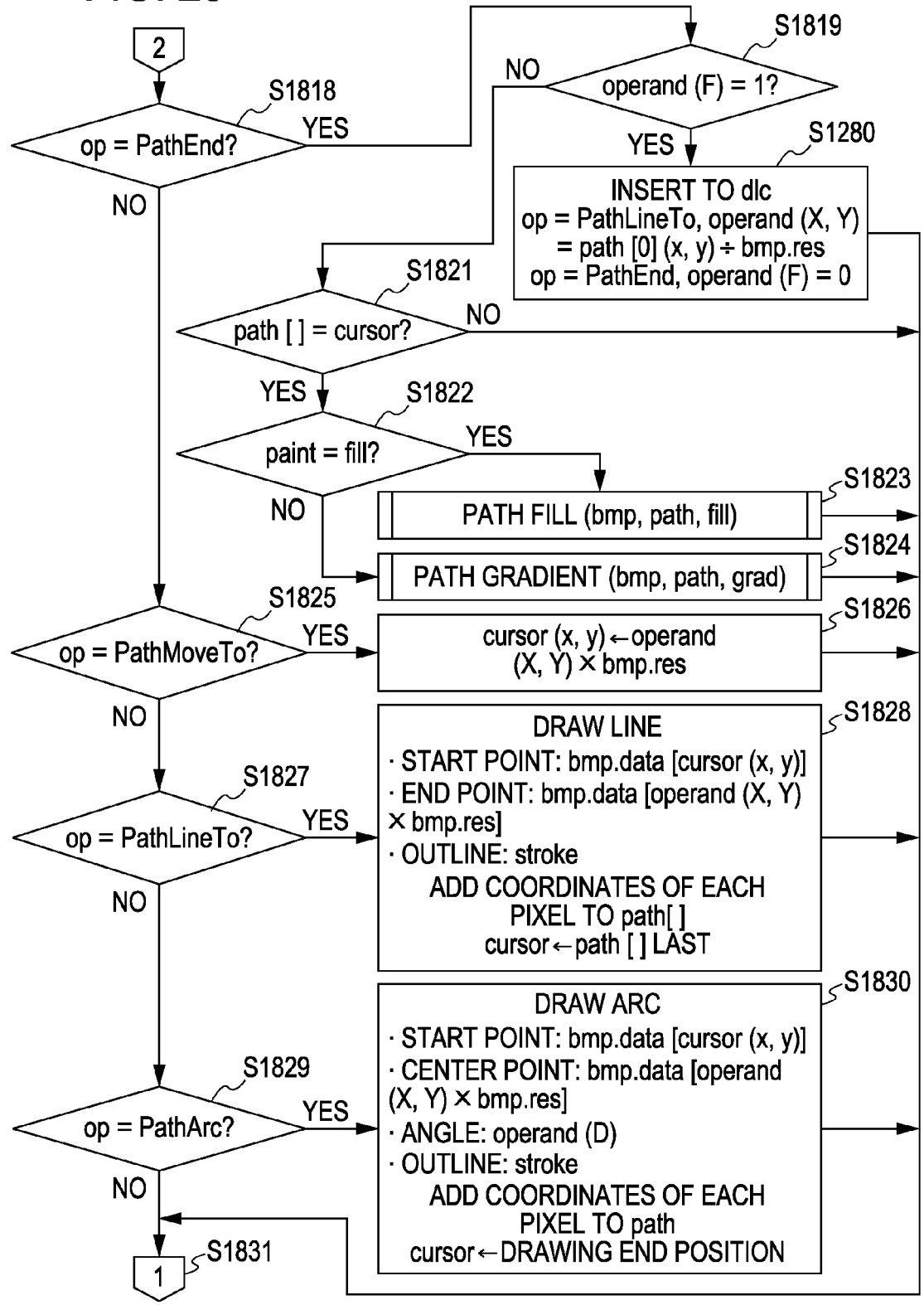
FIG. 23 is a flowchart (2) illustrating the operations of the renderer in the second embodiment.

Next, an overview of the operations of the renderer 1711 will be described with reference to FIGS. 22 and 23. FIGS. 22 and 23 show a flowchart of the operations for the renderer 1711 rendering the intermediate code data 1703 to create bitmap data 1704, which is sent to the controller 314 of the printer 313.

The flow of operations starts at step S1801. Step S1802 is processing for initializing variables. The intermediate code data 1703 obtained by converting the SVG document file 1702 is read into variable dlc. The "fill" is a variable for holding the color used for the filling applied to the rendering command, with (r, g, b, a) representing the elements of the color expressed by RGBA. The initial value is (1.0, 1.0, 1.0, 1.0), i.e., completely non-transparent (alpha value of 1.0) white. The "stroke" is a variable for holding the color and line width used for the outline applied to the rendering command, wherein (r, g, b, w) represents the elements of the color in RGB, and the line width (in pixels). The initial value is (0.0, 0.0, 0.0, 1), i.e., a black line with a width of 1 pixel. The "grad" is a variable of holding the gradient vector to be used for linear gradient filling applied to the rending command. Here, (x1, y1) and (x2, y2) are the coordinates (pixel) of the start point and end point respectively, and (r1, g1, b1) and (r2, g2, b2) respectively represent the gradation start point and end point colors with RGB expressions. There is no initial value. The "paint" is a variable for determining whether to use a single color "fill" or linear gradient "grad", and hold a value of "fill" or "grad". The initial value is "fill".

Step S1803 is processing for obtaining the next opcode and operand from the intermediate code data dlc. The obtained opcode and operand are stored in variables "op" and "operand", respectively. Steps S1804, S1806, S1809, S1811, S1813, S1815, S1818, S1825, S1827, and S1829 are for determining the type of opcode op, so that appropriate processing can be performed corresponding to each opcode.

In step S1804, in the event that the opcode "op" is 0 (mnemonic PageStart), the flow proceeds to step S1805. Otherwise, the flow proceeds to step S1806.

Step S1805 is for performing various initialization processes. First, The "inputProf" is a variable for holding the contents of the input profile 305, "printerProf" is a variable for holding the contents of the printer profile 307, "intent" is a variable for holding the contents of the rendering intent 308, and "bmp" is a variable which stores the bitmap data 1704. Note that the element w of the bmp represents the width (in pixels) of the bitmap data. The page width W (mm) in the operand "operand" is multiplied by the output resolution res, and thus is converted into bitmap increments (pixels). The element h of the bmp represents the height (in pixels) of the bitmap data. The page height H (mm) in the operand "operand" is multiplied by the output resolution res, and thus is converted into bitmap increments (pixels). The element res in the bmp expresses the output resolution of the printer 313 in PPMs (Pixels Per Millimeter).

The element "pdef" in the bmp stores whether to perform pre-rendering color matching or post-rendering color matching. In the event that the flag F of the operand "operand" is 1, "post" is held as the value, otherwise, "pre" is held as the value.

The element data[ ] in the bmp is an array for storing bitmap data, the size being w (pixels) horizontally and h (pixels) vertically. The elements (r, g, b, a) of the data[ ] represent the color of each pixel in RGBA. The values of the elements of data[ ] are initialized to the current "fill" value, i.e., completely non-transparent (alpha value of 1.0) white. In the event that the value of the variable "pdef" is "pre" and pre-rendering color matching is specified, the CMM.gm function is used to map the values of fill from the input gamut to the gamut of the printer 313, following the rendering intent "intent", and the mapped values are stored. The element pre_or_post[ ] of the bmp is an array for storing whether pre-rendering color matching or post-rendering color matching has been performed for the pixels in the bitmap, the size being the same as the array data[ ]. In the event that pre-rendering color matching has been performed, "pre" is held as the value, and in the event that post-rendering color matching has been performed, "post" is held. The initial value is the value of the variable pdef. Following this processing, the flow returns to step S1803.

In the event that the opcode op is 1 (mnemonic PageEnd) in step S1806, printer output defined processing is called up in step S1807, and the flow ends at step S1808. Otherwise, the flow proceeds to step S1809. This printer output defined processing will be described later with reference to FIG. 28.

In step S1809, in the event that the opcode op is 2 (mnemonic Fill), the flow proceeds to step S1810. Otherwise, the flow proceeds to step S1811.

Step S1810 is updating processing of the variable "fill". The color (R, G, B, A) specified in the operand "operand" is stored in the elements (r, g, b, a) of the variable "fill". Also, the value of the variable "paint" is set to "fill", so as to fill using single colors in subsequent painting. Once this processing ends, the flow returns to step S1803.

In step S1811, in the event that the opcode op is 3 (mnemonic GradLinear), the flow proceeds to step S1812. Otherwise, the flow proceeds to step S1813.

Step S1812 is updating processing of the variable "grad". The gradation vector (X1, Y1, X2, Y2, R1, G1, B1, R2, G2, B2) specified in the operand "operand" is stored in the elements (x1, y1, x2, y2, r1, g1, b1, r2, g2, b2) of the variable "grad". Also, the value of the variable "paint" is set to "grad", so as to use gradient in subsequent painting. Once this processing ends, the flow returns to step S1803.

In step S1813, in the event that the opcode op is 4 (mnemonic Stroke), the flow proceeds to step S1814. Otherwise, the flow proceeds to step S1815.

Step S1814 is updating processing of the variable "stroke". The color (R, G, B) and line width (W) specified in the operand "operand" are stored in the elements (r, g, b, w) of the variable "stroke". At this time, in order to convert the increment (mm) of the operand into the increment (pixels) of the bitmap, W is multiplied by the output resolution bmp.res. Once this processing ends, the flow returns to step S1803.

In step S1815, in the event that the opcode op is 5 (mnemonic PathStart), the flow proceeds to step S1816. Otherwise, the flow proceeds from step S1817 to step S1818.

Step S1816 is preparatory processing for the variable "path[ ]" and "cursor" for path rendering. This path[ ] is an array for storing coordinate values for the path. The elements (x, y) of path[ ] are coordinate values representing the coordinates of the path in increments of pixels. This cursor is a variable for storing the current path rendering position, with the elements (x, y) of being coordinate values representing the rendering position in increments of pixels in this case as well. Once this processing ends, the flow returns to step S1803.

In step S1818, in the event that the opcode op is 6 (mnemonic PathEnd), the flow proceeds to step S1819. Otherwise, the flow proceeds to step S1825.

Step S1819 is processing for determining whether or not the flag F of the operand "operand" is 1. In the event that this is 1 the flow proceeds to step S1820, otherwise, the flow proceeds to step S1821.

Step S1820 is closed-path rendering processing. The opcode 8 (mnemonic PathLineTo) is inserted at the current read position of the variable dlc. While the operand is the start position of the current path, which is path[ ], conversion is made from the bitmap increments (pixels) to operand increments (mm), so path [0] is divided by output resolution bmp.res. Also, the opcode 6 (mnemonic PathEnd) is also inserted to perform path ending processing again. There is no need for closed-path rendering processing this time so the operand is 0. Once this processing ends, the flow returns from step S1831 to step S1803.

Step S1821 is processing for determining whether or not path filling is necessary. The value of the variable "cursor" representing the current rendering position of the path and the value of the variable path[ ], which is the path start position, are compared, and in the event that these are equal, determination is made that the path is closed and accordingly needs filling, so the flow proceeds to step S1822. Otherwise, the flow returns from step S1831 to step S1803.

Step S1822 is processing for determining whether to paint using a single color or using gradient. In the event that the value of the variable paint is fill, determination is made to paint using a single color, the flow proceeds to step S1823, otherwise, determination is made to paint using gradient, and the flow proceeds to step S1824.

Step S1823 is processing for calling up defined processing for single color path painting. This path paint defined processing will be described later with reference to FIG. 24.

Step S1824 is processing for calling up defined processing for path gradient. This path gradient defined processing will be described later with reference to FIGS. 26 and 27.

In step S1825, in the event that the opcode op is 7 (mnemonic PathMoveTo), the flow proceeds to step S1826. Otherwise, the flow proceeds to step S1827.

Step S1826 is updating processing of the variables representing the current rendering position of the path. The coordinate values (X, Y) specified in the operand "operand" are stored in the elements (x, y) of the variable "cursor". At this time, in order to convert the increment (mm) of the operand into the increment (pixels) of the bitmap, Operand (X, Y) is multiplied by the output resolution bmp.res. Once this processing ends, the flow returns from step S1831 to step S1803.

In step S1827, in the event that the opcode op is 8 (mnemonic PathLineTo), the flow proceeds to step S1828. Otherwise, the flow proceeds to step S1829.

Step S1828 is processing for rendering a straight line in the bitmap data bmp. The start point is cursor (x, y) which is the current rendering position of the path. The end point is the coordinate values (X, Y) specified with the operand "operand", but in order to convert the increment (mm) of the operand into the increment (pixels) of the bitmap, bmp.data[operand(X,Y)] is multiplied by the output resolution bmp.res. the color (RGB) and line width (pixels) of the variable "stroke" is used for the outline. The coordinate values (in pixels) of the straight line that has been rendered are added to the variable path[ ], and the coordinate value added last (line end point) is stored in the variable "cursor". Once this processing ends, the flow returns from step S1831 to step S1803.

In step S1829, in the event that the opcode op is 9 (mnemonic PathArcTo), the flow proceeds to step S1830. Otherwise, processing is skipped and the flow returns from step S1831 to step S1803, since there is no such case in the intermediate code specifications shown in FIG. 20.

Step S1830 is processing for rendering an arc in the bitmap data bmp. The start point is cursor (x, y) which is the current rendering position of the path. The center point is the coordinate values (X, Y) specified with the operand "operand", but in order to convert the increment (mm) of the operand into the increment (pixels) of the bitmap, bmp.data[operand (X,Y)] is multiplied by the output resolution bmp.res. The angle is the angle D(°) specified with the operand "operand". The color (RGB) and line width (pixels) of the variable "stroke" is used for the outline. The coordinate values (in pixels) of the arc that has been rendered are added to the variable path[ ], and the coordinate value added last is stored in the variable "cursor". Once this processing ends, the flow returns from step S1831 to step S1803.

Figure 24:
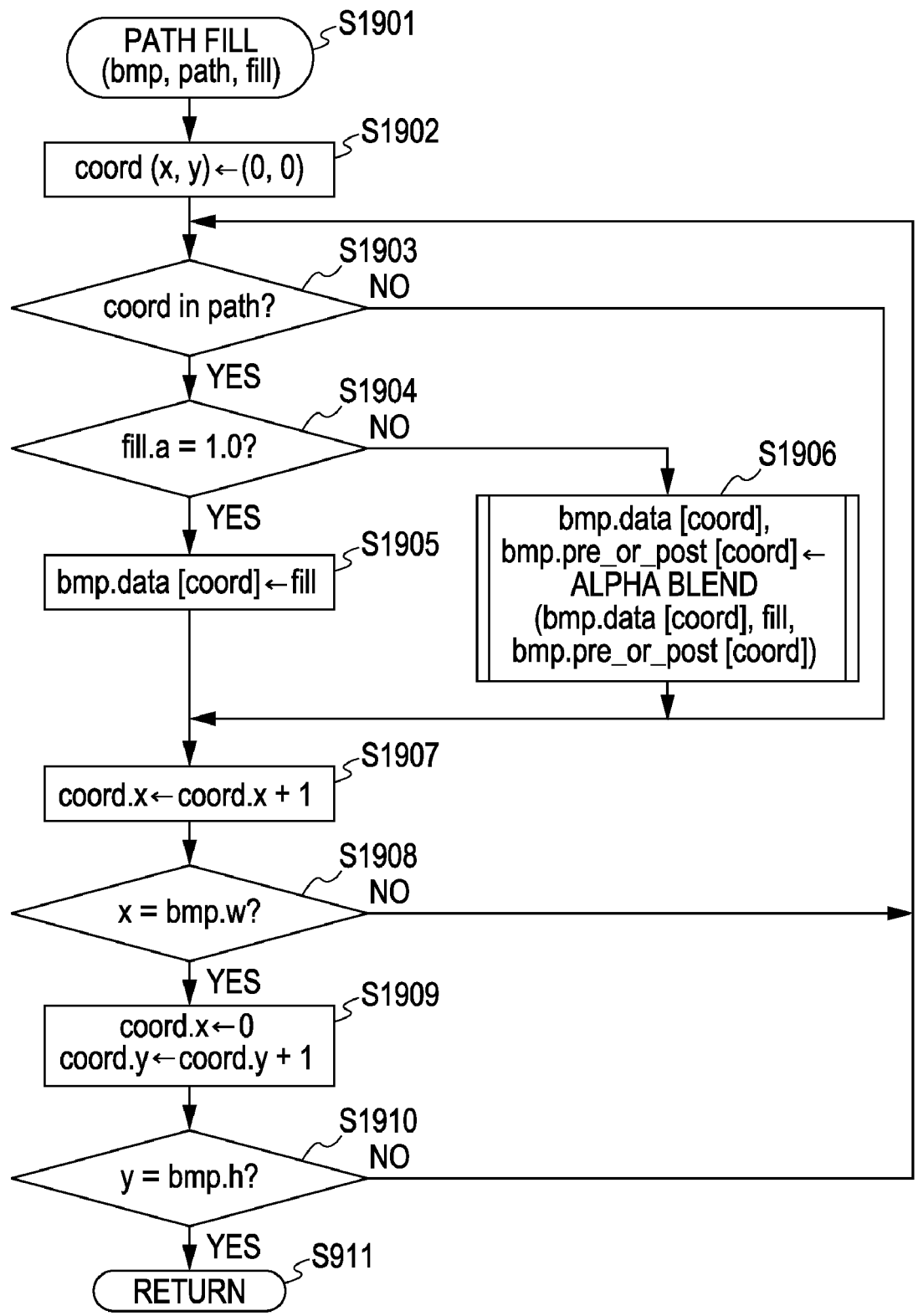
FIG. 24 is a flowchart illustrating path single color fill operations (defined operations) in the second embodiment.

Next, the path fill operation will be described with reference to FIG. 24. FIG. 24 is a flowchart illustrating defined processing operations for path filling. This defined processing is called up from step S1823 in the flowchart shown in FIG. 23.

Step S1901 starts the path fill operation, with bmp, path, and fill being arguments at the time of the defined processing being called up. The argument bmp is initialized in step S1805 in the flowchart of FIGS. 22 and 23, and has the same value as the variable bmp updated in steps S1823, S1824, S1828, and S1830. The argument "path" is initialized in step S1816 in the flowchart of FIGS. 22 and 23, and has the same value as the variable path updated in steps S1828 and S1830. The argument "fill" is initialized in step S1802 in the FIG. 22, and has the same value as the variable fill updated in step S1810.

Step S1902 is variable initialization processing. Here, "coord" is a variable for holding coordinate values at the time of scanning the bitmap data bmp.data[ ] from the upper left to lower right, with (x, y) representing coordinate values in increments of pixels. The initial value is (0, 0), indicating the upper left of the bitmap data bmp.data. The flowchart shown in FIG. 24 is a loop wherein the variable coord is a loop variable.

Step S1903 is processing for determining whether or not coordinate values representing the variable coord are within a path represented by the variable "path". This processing is called up in step S1823 only in the event that determination is made in step S1821 that the variable "path" is a closed path, so the path represented by the variable "path" will always be a closed path here, and determination can be made regarding whether within the path or not for arbitrary coordinate values. In the event that determination is made within the path, the flow proceeds to Step S1904. If not within the path, the flow proceeds to Step S1907.

Step S1904 is processing for determining whether or not the alpha value of the color which the variable "fill" represents is 1.0 (completely non-transparent). In the event that the alpha value is 1.0 (completely non-transparent), determination is made that there is no need for alpha blending, and the flow proceeds to Step S1905. In the event that the alpha value is other than 1.0 (i.e., has transparency), determination is made that there is need for alpha blending, and the flow proceeds to Step S1906.

Step S1905 is filling processing performed in the event that the alpha value for the variable "fill" is 1.0 (completely non-transparent). In this case, there is no need for alpha blending, so the color at the coordinate position coord in the bitmap data bmp.data[ ] is replaced with the color specified by the variable "fill".

Step S1906 is processing for calling up the defined processing for alpha blend, performed in the event that the alpha value of the variable "fill" is other than 1.0 (i.e., has transparency). Return values for alpha blend defined processing are the color following alpha blending (RGBA) and a flag regarding whether pre-rendering color matching or post-rendering color matching has been performed ("pre" or "post"). As a result, the values of the bitmap data bmp.data[ ] and the flag bmp.pre_or_post[ ] at the coordinates position coord are replaced with the returned values. Defined processing for alpha blending will be described later with reference to FIG. 25.

Steps S1907 through S1910 are loop processing. Step S1907 is processing for incrementing the horizontal direction value coord.x of the variable coord by 1. Step S1908 is processing for determining whether or not the horizontal direction value coord.x of the variable coord has become equal to the size of the bitmap data in the horizontal direction, i.e., bmp.w. In the event that these are equal, the flow proceeds to Step S1909, and if not equal the flow returns to Step S1903.

Step S1909 is processing for initializing the horizontal direction value coord.x of the variable coord to 0 and incrementing the vertical direction value coord.y of the variable coord by 1. Step S1910 is processing for determining whether or not the vertical direction value coord.y of the variable coord has become equal to the size of the bitmap data in the vertical direction, i.e., bmp.y. In the event that these are equal, the flow proceeds to Step S1911, and if not equal the flow returns to Step S1903.

Step S1911 is the end. Though there are no return values of the defined processing, the bitmap data bmp.data[ ] and the bmp.pre_or_post[ ] handed with the argument bmp are updated.

Figure 25:
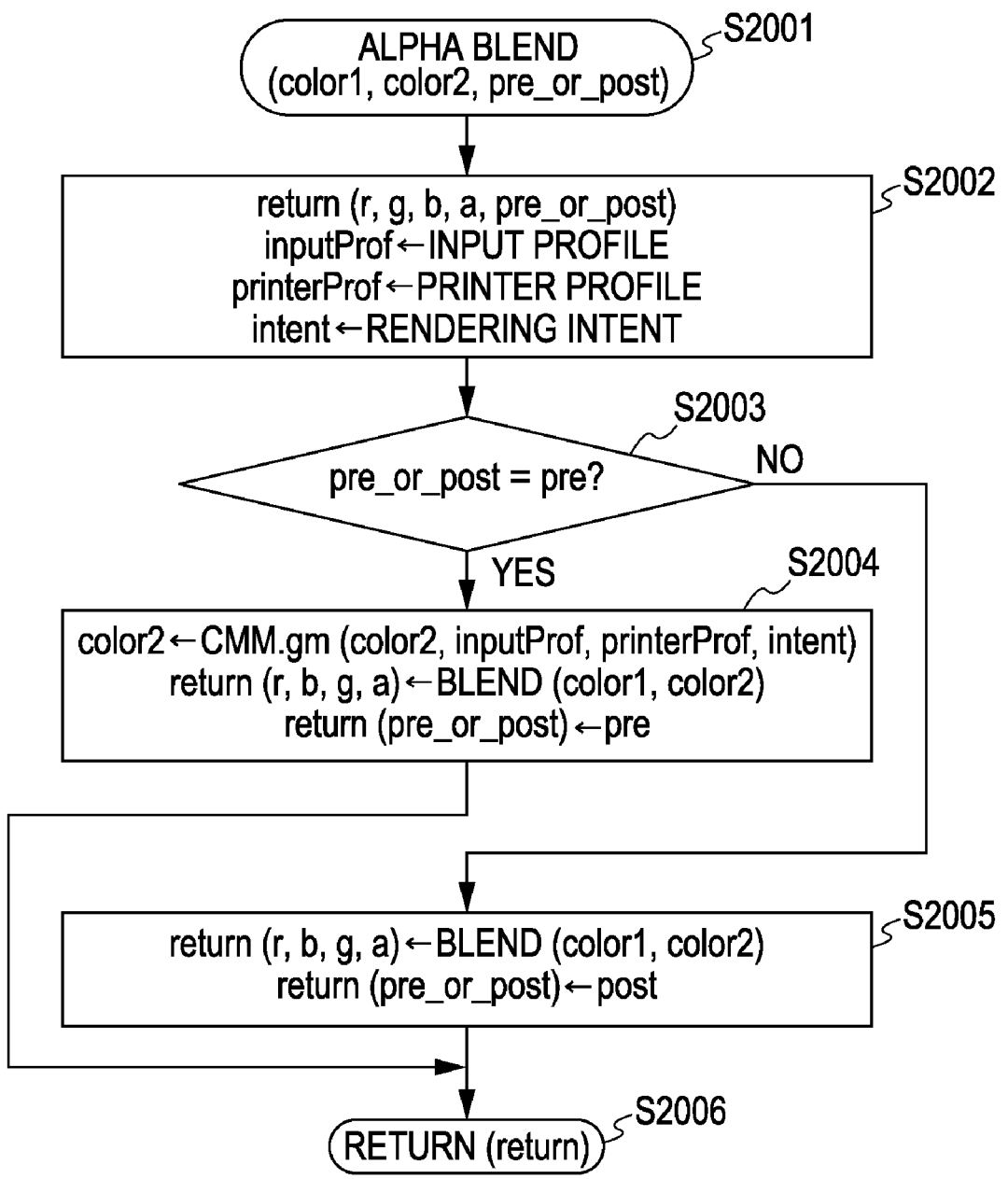
FIG. 25 is a flowchart illustrating alpha blend operations (defined operations) in the second embodiment.

Next, alpha blending rendering operations will be described with reference to FIG. 25. FIG. 25 is a flowchart showing the defined processing for alpha blending. This defined processing is called up from Step S1906 in the flowchart shown in FIG. 24.

Step S2001 is the start of alpha blending. The arguments "color1", "color2", and pre_or_post are the arguments at the time of calling up the defined processing. The argument "color1" is the color value at arbitrary coordinates in the bitmap data bmp.data[ ] initialized in step S1805 in FIG. 22 and updated at steps S1905 and S1906 in FIG. 24, or other steps. The argument "color2" is the color value of the variable "fill" initialized in step S1802 in FIG. 22 and updated in step S1810. The argument pre_or_post is a flag value at an arbitrary coordinate of the variable bmp.pre_or_post[ ] updated in step S1906 of FIG. 24 and step S2110 of FIG. 26.

Step S2002 is initialization processing for variables. The "return" is a variable for holding return values, with the elements (r, g, b, a) representing the elements of the color in RGBA. The element pre_or_post is for holding whether pre-rendering color matching or post-rendering color matching has been performed, and holds the value "pre" or the value "post". The "inputProf" is a variable for holding the contents of the input profile 305. The "printerProf" is a variable for holding the contents of the printer profile 307. The "intent" is a variable for holding the contents of the rendering intent 308.

Step S2003 is processing for determining the value of the argument pre_or_post. In the event that the value of the argument pre_or_post is "pre", the flow proceeds to step S2004. Otherwise, the flow proceeds to step S2005.

Step S2004 is rendering processing performed in the event of performing pre-rendering color matching. First, the CMM.gm function of the CMM 312 is used to map the value of the argument color2 from the input gamut to the gamut of the printer 313 following the rendering intent "intent", and the results are stored in the variable color2 again. In the event that the value of the argument pre_or_post is "pre", gamut mapping has already been performed for the bitmap data at that coordinate, so there is no processing necessary for the argument color1. Next, the value of color1 and the value of color2 following mapping are blended, and the results are stored in a variable return(r, g, b, a). Finally, the value "pre" is stored in a variable return.pre_or_post. The blending processing can be calculated from the value (r, g, b, a) of color1 and the value (r, g, b, a) of color2, by the following expressions.

$$\text{return}.r = \text{color1}.r \times \text{color1}.a \times (1 - \text{color2}.a) + \text{color2}.r \times \text{color2}.a$$

$$\text{return}.g = \text{color1}.g \times \text{color1}.a \times (1 - \text{color2}.a) + \text{color2}.g \times \text{color2}.a$$

$$\text{return}.b = \text{color1}.b \times \text{color1}.a \times (1 - \text{color2}.a) + \text{color2}.b \times \text{color2}.a$$

$$\text{return}.a = \text{color1}.a \times (1 - \text{color2}.a) + \text{color2}.a$$

Step S2005 is rendering processing performed in the event of performing post-rendering color matching. The value of the variable color1 and the value of the variable color2 are blended, the results are stored in a variable return(r, g, b, a), and "post" is stored in the variable return.pre_or_post. The blending processing is the same as that in step S2004.

Step S2006 is the end. The value of the variable "return" is returned as a return value.

Figure 26:
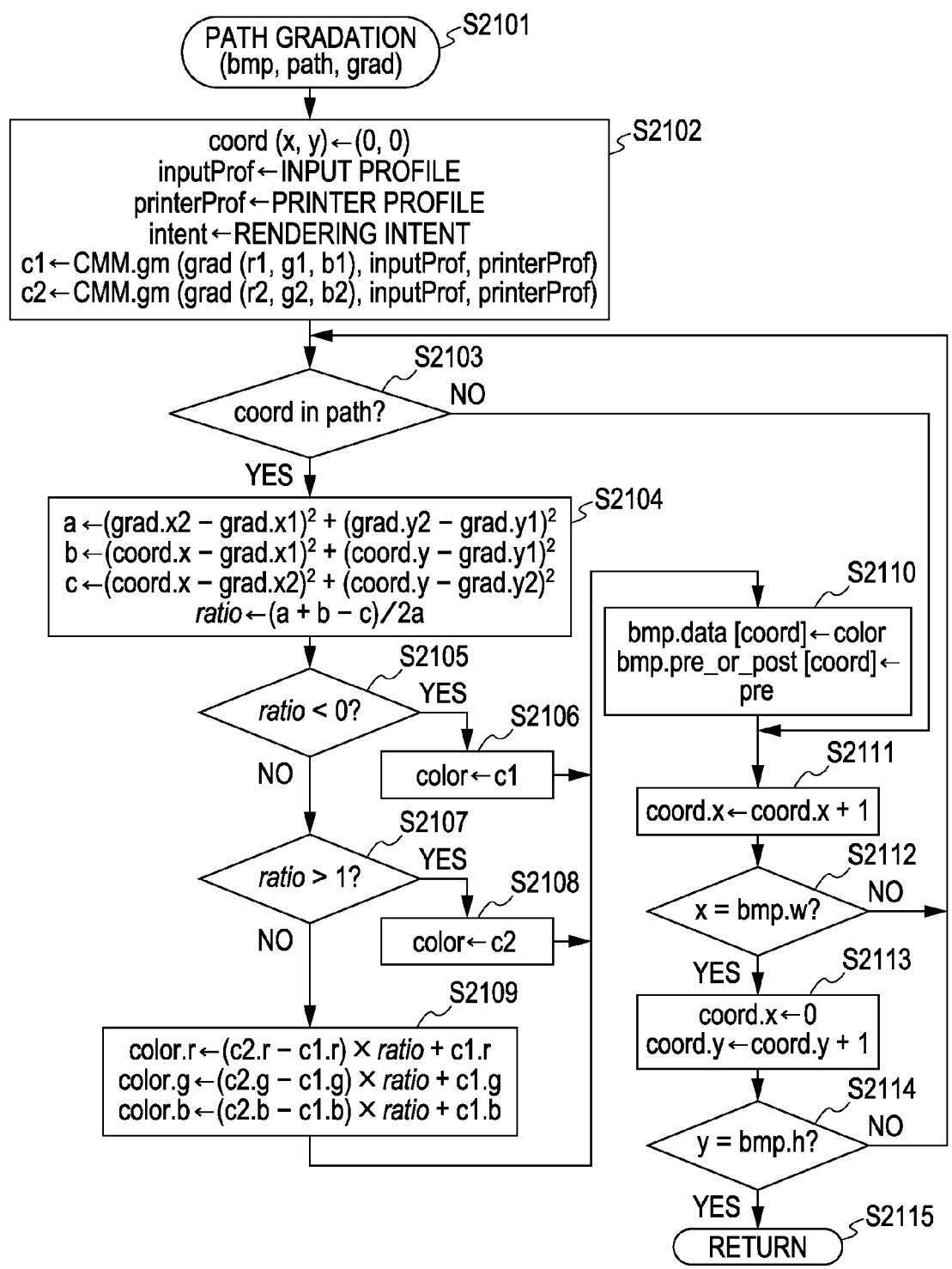
FIG. 26 is a flowchart illustrating path gradient operations (defined operations) in the second embodiment.
Figure 27:
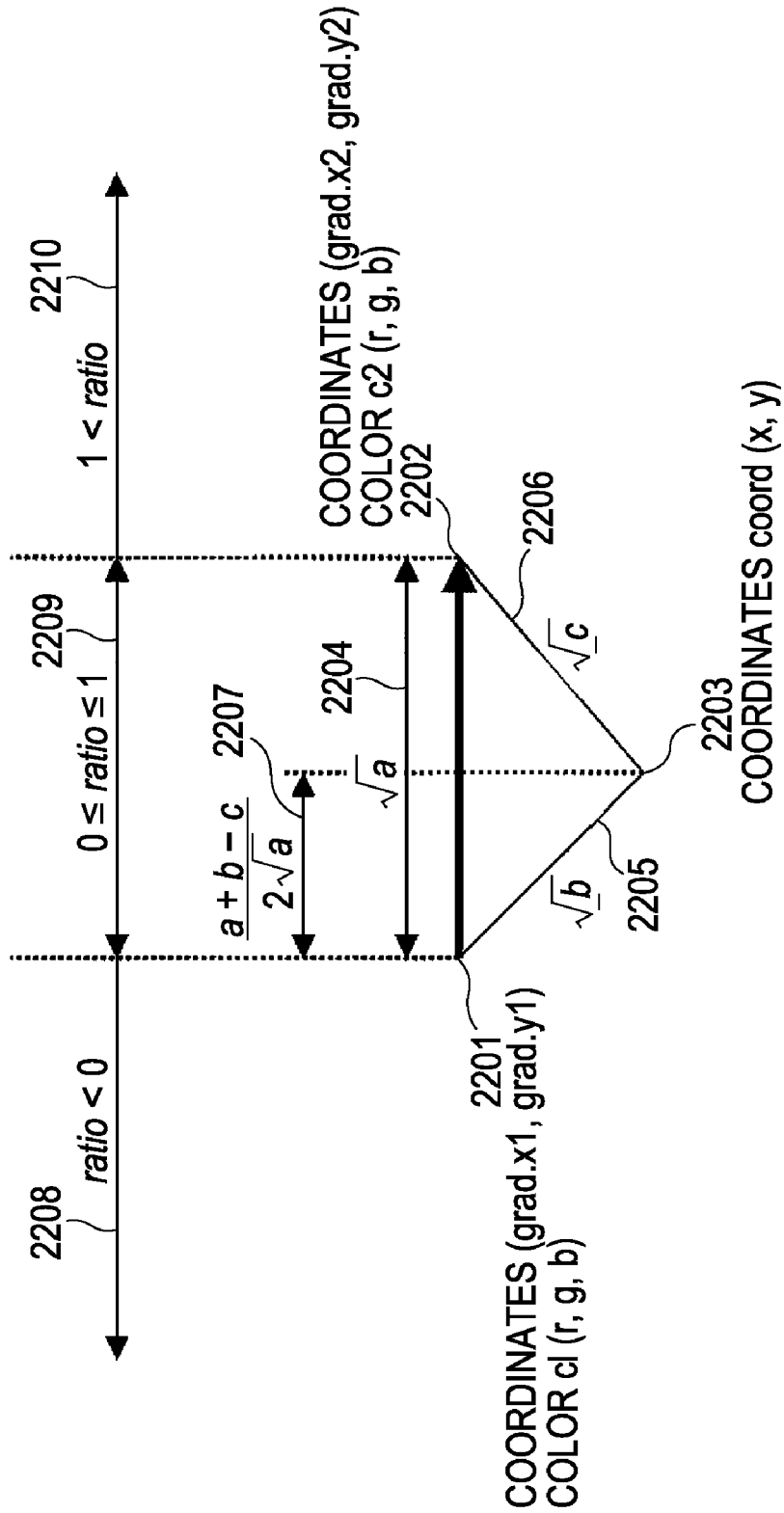
FIG. 27 is a diagram illustrating path gradient operations (defined operations) in the second embodiment.

Next, the operations of path gradient rendering will be described with reference to FIGS. 26 and 27. FIG. 26 is a flowchart illustrating the defined processing for path gradation processing. The defined processing is called up from step S1824 of the flowchart shown in FIG. 23.

Step S2101 is the start of path gradient operations. The arguments "bmp", "path", and "grad" are those used when calling up the defined processing. The argument bmp has the same value as the variable bmp initialized at step S1805 in the flowchart shown in FIGS. 22 and 23 and updated in steps S1823, S1824, S1828, and S1830. The argument "path" has the same value as the variable "path" initialized at step S1816 and updated in steps S1828 and S1830 in the flowchart shown in FIGS. 22 and 23. The argument "grad" has the same value as the variable "grad" prepared in step S1802 and updated in step S1812 shown in FIG. 22.

Step S2102 is variable initialization processing. Here, "coord" is a variable for holding coordinate values at the time of scanning the bitmap data bmp.data[ ] from the upper left to lower right, with (x, y) representing coordinate values in increments of pixels. The initial value is (0, 0) and represents the upper left of the bitmap data bmp.data. The flowchart shown in FIG. 26 is configured of loop processing wherein the variable "coord" is a primary loop variable. The "inputProf" is a variable for holding the contents of the input profile 305. The "printerProf" is a variable for holding the contents of the printer profile 307. The "intent" is a variable for holding the contents of the rendering intent 308. The variables c1 and c2 store color values obtained by using the CMM.gm function to map the arguments color1 and color2 from the input gamut (expressed by inputProf) to the gamut of the printer 313 (expressed by printerProf) following the rendering intent "intent".

Step S2103 is processing for determining whether or not coordinate values representing the variable "coord" are within a path represented by the variable "path". This processing is called up in step S1824 only in the event that determination is made in step S1821 that the variable "path" is a closed path, so the path represented by the variable "path" will always be a closed path here, and determination can be made regarding whether within the path or not for arbitrary coordinate values. In the event that determination is made within the path, the flow proceeds to step S2104. If not within the path, the flow proceeds to step S2111.

Step S2104 is preparatory processing for obtaining the color values for gradient at the coordinate values which the variable "coord" represents. In step S2104, "ratio" is calculated from the values "a", "b", and "c", shown in FIG. 27, with each being stored to the respective variables.

Now, description will be made regarding the values "a", "b", "c", and "ratio", with reference to FIG. 27. FIG. 27 shows the relation between the start position, start color, end position, and end color, of the gradient vector, expressed by the argument "grad", and the coordinate position expressed by the variable "coord" and the gradient color. Reference numeral 2201 denotes the start position of the gradient vector. Reference numeral 2202 denotes the end position of the gradient vector. Reference numeral 2203 denotes the position of the variable "coord". Reference numeral 2204 denotes the distance between the start position 2201 and the end position 2202. This will be expressed as $\sqrt{a}$. Reference numeral 2205 denotes the distance between the start position 2201 and the position 2203 of the variable "coord". This will be expressed as $\sqrt{b}$. Reference numeral 2206 denotes the distance between the end position 2202 and the position 2203 of the variable "coord". This will be expressed as $\sqrt{c}$. A gradient color at a position of the variable "coord" is at a position which has progressed from the start color toward the end color direction by a distance indicated by 2207. Now, a value obtained by dividing $(a+b-c)/2\sqrt{a}$, which is the distance 2207, by the distance 2204, is ratio=$(a+b-c)/2a$. Now, in the event that the ratio here is smaller than 0, as indicated by 2208, the position 2203 of the variable coord is before the start position 2201, i.e., toward the left in the drawing. In the event that the ratio is in the range of 0 to 1, as indicated by 2209, the position 2203 of the variable coord is between the start position 2201 and the end position 2202. In the event that the ratio is greater than 1, as indicated by 2210, the position 2203 of the variable coord is beyond the end position 2202, i.e., toward the right in the drawing.

Step S2105 is determination processing regarding whether or not the variable ratio is smaller than 0. In the event of being smaller than 0, the flow proceeds to step S2106. Otherwise, the flow proceeds to step S2107.

Step S2106 is processing for setting the start color c1 of the gradient vector for the color value "color" of the gradient at the position of the variable "coord", in the event that the position which the variable "coord" shows is at a position before the gradient vector which the variable "grad" represents.

Step S2107 is determination processing regarding whether or not the variable ratio is greater than 1. In the event of being greater than 1, the flow proceeds to step S2108. Otherwise, the flow proceeds to step S2109.

Step S2108 is processing for setting the end color c2 of the gradient vector for the color value "color" of the gradient at the position of the variable "coord", in the event that the position which the variable "coord" shows is at a position beyond the gradient vector which the variable "grad" represents.

Step S2109 is processing for calculating the color value "color" of the gradient at the position of the variable "coord", in the event that the position which the variable "coord" shows is at a position within the gradient vector which the variable "grad" represents. In this step, the variable "ratio" assumes a value between 0 to 1, which indicates the distance from c1 to color wherein the distance from the start color c1 of the gradient vector to the end color c2 is 1. Accordingly, "color" is calculated by the following expression.

$$color=(c2-c1)\cdot ratio+c1$$

Step S2110 is updating processing of the argument bmp. The value of coordinates position coord of the bitmap data bmp.data[ ] and flag bmp.pre_or_post[ ] are respectively replaced with the value of the variable "color" and "pre".

Steps S2111 through S2114 are loop processing. Step S2111 is processing for incrementing the horizontal direction value coord.x of the variable coord by 1. Step S2112 is processing for determining whether or not the horizontal direction value coord.x of the variable coord has become equal to the size of the bitmap data in the horizontal direction, i.e., bmp.w. In the event that these are equal, the flow proceeds to step S2113, and if not equal the flow returns to step S2103.

Step S2113 is processing for initializing horizontal direction value coord.x of the variable coord to 0, and incrementing the vertical direction value coord.y of the variable coord by 1. Step S2114 is processing for determining whether or not the vertical direction value coord.y of the variable coord has become equal to the size of the bitmap data in the vertical direction, i.e., bmp.h. In the event that these are equal, the flow proceeds to step S2115, and if not equal the flow returns to step S2103.

Step S2115 ends the flow. There is no return value to this defined processing, but the bitmap data bmp.data[ ] and flag bmp.pre_or_post[ ] are updated.

Next, the operations of printer output will be described with reference to FIG. 28. FIG. 28 is a flowchart describing the operations for defined processing regarding printer output. The defined processing is called up from step S1807 in the flowchart shown in FIG. 22.

Step S2301 starts the defined processing. The argument bmp has the same value as the variable bmp initialized in step S1805 in the flowchart shown in FIGS. 22 and 23, and rendered in steps S1823, S1824, S1828, and S1830.

Step S2302 is variable initialization processing. Here, "coord" is a variable for holding coordinate values at the time of scanning the bitmap data bmp.data from the upper left to lower right, with (x, y) representing coordinate values in increments of pixels. The flowchart shown in FIG. 24 is configured of loop processing wherein the variable "coord" is a primary loop variable. The "inputProf" is a variable for holding the contents of the input profile 305. The "printerProf" is a variable for holding the contents of the printer profile 307. The "intent" is a variable for holding the contents of the rendering intent 308. The oputputbmp[ ] is an array for holding bitmap data for printer output, and the size thereof is the same as that of bmp.data[ ].

Step S2303 is processing for obtaining bitmap data of a coordinate value indicated by the variable "coord" and the "pre" or "post" value from the bmp.data[ ] and bmp.pre_or_post[ ]. The obtained values are stored in the variables "data" and "pre_or_post", respectively.

Step S2304 is a determination process for whether or not the variable pre_or_post has the value "pre". In the event that this is true, the color value of the pixel has already been mapped to the gamut of the printer 313. In this case, the flow proceeds to Step S2306. Otherwise, the flow proceeds to Step S2305.

Step S2305 is processing for using the CMM.gm function of the CMM 312 to map the pixel data from the input gamut to the gamut of the printer 313 in accordance with the rendering intent "intent". The results are overwritten on the variable "data".

In Step S2306, the color values of the variable "data" are already mapped to the gamut of the printer 313, so the CMM.cc function of the CMM 312 is used to convert from the input gamut to the gamut of the printer 313. The results are stored at the coordinate position which the variable "coord" indicates in the printer output bitmap data outputbmp[ ].

Steps S2307 through S2310 are loop processing. Step S2307 is processing for incrementing the horizontal direction value coord.x of the variable coord by 1. Step S2308 is processing for determining whether or not the horizontal direction value coord.x of the variable coord has become equal to the size of the bitmap data in the horizontal direction, i.e., bmp.w. In the event that these are equal, the flow proceeds to Step S2309, and if not equal the flow returns to Step S2303.

Step S2309 is processing for incrementing the vertical direction value coord.y of the variable coord by 1. Step S2310 is processing for determining whether or not the vertical direction value coord.y of the variable coord has become equal to the size of the bitmap data in the vertical direction, i.e., bmp.h. In the event that these are equal, the flow proceeds to Step S2311, and if not equal the flow returns to Step S2303.

Step S2311 is processing for sending the created printer output bitmap data outputbmp[ ] to the controller 314 of the printer 313. The printer 313 stores the received bitmap data in the RAM 209 as bitmap data 315, and controls the printer engine 212 according to the bitmap data 315 to execute output.

Step S2312 is the end. There is no return value.

Conventionally-known color matching using profiles requires interpolation processing to obtain colors following color matching. This interpolation processing causes computation error. With configurations wherein gradation is performed before color matching, colors are obtained in increments of pixels between 2201 and 2202, and color matching is performed for each of these colors. In the event of performing gradation (path gradient) rendering before color matching, the colors rendered in increments of pixels between 2201 and 2202 contain error, and color matching is performed for the colors in increments of pixels with error. Accordingly, it is probable that a smooth gradient cannot be obtained.

Conversely, with the present embodiment, of the PDL drawing commands, gradation (path gradient) rendering is performed such that color matching is carried out before rendering, regardless of the pre-rendering/post-rendering color matching settings 1709. Due to this configuration, the colors following color matching between the gradient start position 2201 and end position 2202 are obtained, and the colors of the pixels between 2201 and 2202 can be calculated according to the ratio in FIG. 27. Accordingly, a gradient where colors change smoothly can be realized.

The present embodiment described above is advantageous in that suitable color matching can be performed even in cases wherein a particular type of rendering is specified where problems may occur depending on whether color matching is performed before rendering or following rendering.

Other Embodiments

While the intermediate code data has been described as being rendered at the client PC 101 in the above first and second embodiments, the intermediate code data may be sent form the client 101 to the printer 103 so as to be rendered at the printer 103.

Also, while rendering has been described as being performed in the input gamut (color space) expressed by the input profile in the above first and second embodiments, rending may be performed in the rendering gamut (color space) expressed by the rendering profile 306. Or, rending may be performed in the rendering printer gamut (color space) expressed by the printer profile 307.

Also, while SVG 1.1 has been described as being the PDL used in the above first and second embodiments, the present invention is by no way restricted to this, and other versions of SVG, or any other PDL may be used as long as capable of converting into intermediate code.

Also, while description has been made in the above first and second embodiments with regard to an example of displaying/printing one page, in the event that the PDL corresponds to multiple pages, the intermediate code, viewer program, and controller can be made to correspond thereto.

Also, a single input profile and rendering intent were used for an SVG document with the above first and second embodiments. However, an arrangement may be made wherein input profile and rendering intent can be specified for each type of object in the SVG document, such as images, graphics, text objects, and so forth. Further, a system can be conceived wherein input profiles and rendering intent can be specified for each individual object.

Also, while description has been made in the above first and second embodiments with regard to an example of linear gradient alone, the present invention can correspond to optional types of gradient, such as radial gradient and so forth. Also, while before and after the gradient vector have been describe as being painted with the start color and end color respectively, there are other techniques, such as repeating the gradient vector, mirroring the gradient vector, and so forth.

Also, while FIG. 1 shows the client PC and the printer being connected by a network, other connection types may be used as well. For example, arrangements may be made wherein the PC and printer are directly connected, or wherein the data is handed over via media such as a memory card or a CD.

Also, while FIG. 2 shows programs being stored in the RAM 202, the preset invention is not restricted to this, and arrangements may be made wherein the programs are read in from the external storage device 204 and executed, or received via the network interface 203 and executed. Also, while not shown in FIG. 2, an arrangement may be made wherein the programs are read out from dedicated built-in storage units such as ROM, and executed. Also, other input devices, such as voice input or the like, may be provided instead of or in addition to the keyboard 206 and pointing device 207. Also, cases of sharing the display 205, keyboard 206, and pointing device 207 with other computer devices, can be conceived.

While FIG. 17 shows the intermediate code data 1703 and the bitmap data 1704 and 315 being held in RAM, arrangements may be made wherein the data is stored in permanent storage such as in files, databases, or the like. Also, an arrangement may be conceived wherein intermediate code data used for the same PDL document is cached and used for subsequent processing.

Also, while FIG. 20 illustrates specifications of intermediate code, the specifications of intermediate code which can be used are not restricted to this. For example, increments are not restricted to millimeters and may be other optional increments, or a combination of both. Path descriptions may be Bezier curves, elliptic arcs, or other optional paths that are capable of mathematical representation. Painting is not restricted to single colors and linear gradients, and may allow for complicated painting such as brush, image, radial gradients, and so forth. Color is not restricted to RGB and RGBA, and may allow for specification by color profile, specification by device color, specification by Color No., and so forth. Also, the arrangement of using 1-byte integers for opcodes and 2-byte floating-point numbers for operands is a mere example, and other encoding methods may be used. Or, in arrangements wherein the intermediate code is sent to the printer 103, a PDL which the printer 103 is capable of interpreting may be used.

Also, while FIGS. 24 and 26 illustrate a case of using general-purpose algorithms to scan the entire bitmap, and determining whether each coordinate is included in a path which the argument "path" expresses. Another conceivable method is to extract coordinates included in a path which the argument "path" expresses beforehand, and performing rendering regarding these coordinates. Also, More efficient techniques may be used for gradient, such as calculating the color values of the gradient vector beforehand, and repeatedly applying this within the path.

Although the embodiments described above relate to imaging apparatus such as printers, the present invention is also applicable to monitors and other display means.

Now, an arrangement may be made wherein the programs of the software for realizing the functions of the embodiments described above are directly or remotely supplied to the system or device, with a computer of the system or device reading out and executing the program code supplied thereto. In this case, the program code does not need to assume the form of a program, as long as it has program functions.

Accordingly, in order to realize the functional processing according to the preset invention, the program code itself installed in the computer, and the recording medium storing the program, also make up the above-described embodiments. That is to say, the above embodiments include the computer program itself for realizing the embodiments, and the recording medium storing the programs.

As long as the functions of programs are possessed, the format of the program is of no concern, whether object code, programs to be executed by interpreters, script data to be supplied to the Operating System, and so forth.

Storage media for supplying the programs include, but are not restricted to, flexible disks, hard disks, optical disks, and magneto optical disks. Some examples include MO, CD-ROM, CD-R, CD-RW, magnetic tape, non-volatile memory cards, ROM, and DVD (DVD-ROM, DVD-R).

Other arrangements for supplying programs include a client computer first using a Web browser to access a homepage on the Internet, and downloading from the homepage, either a computer program itself, or a file which is compressed with self-installing functions, to a storage medium such as a hard disk or the like. Also, the program code making up the programs of the above embodiments may be divided into multiple files, with each of the files being downloaded from various homepages on the Internet to realize the functions thereof. Thereof, it is to be understood that Web servers which allow multiple users to download program files for causing computers to realize the functions of the embodiments are also encompassed by the embodiments.

Also, an arrangement may be made wherein programs for realizing the processing of the embodiments are stored encrypted in a storage medium such as a CD-ROM and distributed to users, and only users who have satisfied predetermined conditions are permitted to download key information for decrypting the programs from a homepage on the Internet. The key information can be used to execute the encrypted programs so as to be installed to the computer and realized.

Also, an arrangement may be made wherein the functions of the embodiments are realized by the computer executing the programs that have been read out. Also, an arrangement may be made wherein the Operating System or the like running on the computer performs part or all of the actual processing based on the instructions of the programs, thereby realizing the functions of the embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-168569 filed Jun. 8, 2005 and No. 2005-168570 filed Jun. 8, 2005, which are hereby incorporated by reference herein in their entirety.

What is claimed is:

1. An imaging device comprising:
rendering means for rendering a description language document, the rendering means including a processor;
color matching means for converting color information specified in said description language document into color information for an imaging device which is to image said description language document, the color matching means including a processor;
selecting means for determining whether to perform said converting by said color matching means before said rendering of the rendering means or following said rendering of the rendering means on the basis of comparing a color difference value obtained when color matching is performed before the rendering of the rendering means with a color difference value obtained when the color matching is performed following the rendering of the rendering means, and selecting one or the other based on the determination results, the selecting means including a processor;
database means for holding a rendering and converting result corresponding to the selection result and information of a color matching condition when the selection result is obtained, the database means including a processor;

search means for searching, in a case wherein alpha blend rendering is necessary for a description language document, information of a color matching condition held in said database means which is the same as a color matching condition for the description language document, the search means including a processor; and obtaining means for obtaining a rendering and converting result held in said database means corresponding to the searched information of color matching condition, the obtaining means including a processor.

2. The imaging device according to claim 1, wherein the selection by said selecting means is made upon verifying the results of the case wherein said converting by said color matching means is performed before said rendering of the rendering means and the case wherein said converting is performed following said rendering of the rendering means.

3. The imaging device according to claim 1, said selecting means comprising:

setting means for setting whether to perform said conversion by said color matching means before said rendering of the rendering means or following said rendering of the rendering means; and control means for effecting control, in the event of rendering a specific rendering command at said rendering means, such that said conversion by said color matching means is performed before said rendering of the rendering means regardless of the settings of said setting means.

4. The imaging device according to claim 3, wherein said specific rendering command is a gradient command.

5. An imaging control method comprising:

a rendering step for rendering a description language document;

a color matching step for converting color information specified in said description language document into color information for an imaging device which is to image said description language document;

a selecting step, performed by a processor, for determining whether to perform the conversion in said color matching step before said rendering in the rendering step or following said rendering in the rendering step on the basis of comparing a color difference value obtained when color matching is performed before the rendering in the rendering step with a color difference value obtained when the color matching is performed following the rendering in the rendering step, and selecting one or the other based on the determination results;

a holding step for holding, in a database, a rendering and converting result corresponding to the selection result and information of a color matching condition when the selection result is obtained;

a searching step for searching, in a case wherein alpha blend rendering is necessary for a description language document, information of a color matching condition held in said database which is the same as a color matching condition for the description language document; and an obtaining step for obtaining a rendering and converting result held in said database corresponding to the searched information of color matching condition.

6. The method according to claim 5, wherein the selection in said selecting step is made upon verifying the results of the case wherein said conversion in said color matching step is performed before said rendering in the rendering step and the case wherein said conversion is performed following said rendering in the rendering step.

7. The imaging control method according to claim 5 in which the selecting step includes:

a setting step for setting whether to perform said conversion in said color matching step before said rendering in the rendering step or following said rendering in the rendering step; and a control step for effecting control, in the event of rendering a specific rendering command in said rendering step, such that said conversion in said color matching step is performed before said rendering in the rendering step regardless of the settings in said setting step.

8. The method according to claim 7, wherein said specific rendering command is a gradient command.

9. A non-transitory computer-readable storage medium storing a program for causing a computer to execute a method comprising:

a rendering step for rendering a description language document;

a color matching step for converting color information specified in said description language document into color information for an imaging device which is to image said description language document;

a selecting step for determining whether to perform the conversion in said color matching step before said rendering in the rendering step or following said rendering in the rendering step on the basis of comparing a color difference value obtained when color matching is performed before the rendering in the rendering step with a color difference value obtained when the color matching is performed following the rendering in the rendering step, and selecting one or the other based on the determination results;

a holding step for holding, in a database, a rendering and converting result corresponding to the selection result and information of a color matching condition when the selection result is obtained;

a searching step for searching, in a case wherein alpha blend rendering is necessary for a description language document, information of a color matching condition held in said database which is the same as a color matching condition for the description language document; and an obtaining step for obtaining a rendering and converting result held in said database corresponding to the searched information of color matching condition.

10. The non-transitory computer-readable storage medium according to claim 9, wherein the selection in said selecting step is made upon verifying the results of the case wherein said conversion in said color matching step is performed before said rendering in the rendering step and the case wherein said conversion is performed following said rendering in the rendering step.

11. The non-transitory computer-readable storage medium according to claim 9, in which the selecting step includes:

a setting step for setting whether to perform said conversion in said color matching step before said rendering in the rendering step or following said rendering in the rendering step; and a control step for effecting control, in the event of rendering a specific rendering command in said rendering step, such that said conversion in said color matching step is performed before said rendering in the rendering step regardless of the settings in said setting step.

12. The non-transitory computer-readable storage medium according to claim 11, wherein said specific rendering command is a gradient command.

* * * * *